(12) United States Patent
Balabine et al.

(10) Patent No.: US 7,069,438 B2
(45) Date of Patent: Jun. 27, 2006

(54) ESTABLISHING AUTHENTICATED NETWORK CONNECTIONS

(75) Inventors: Igor V. Balabine, Cupertino, CA (US); William G. Friedman, Atherton, CA (US); Ilya G. Minkin, Los Altos, CA (US)

(73) Assignee: Sowl Associates, Inc., Atherton, CA (US)

( * ) Notice: Subject to any disclaimer, the term of this patent is extended or adjusted under 35 U.S.C. 154(b) by 327 days.

(21) Appl. No.: 10/224,098

(22) Filed: Aug. 19, 2002

(65) Prior Publication Data
US 2004/0034773 A1 Feb. 19, 2004

(51) Int. Cl.
*G06F 17/00* (2006.01)

(52) U.S. Cl. .................... 713/168; 713/151; 726/14
(58) Field of Classification Search ............. 713/168, 713/150, 153, 151; 370/229; 379/111; 726/14
See application file for complete search history.

(56) References Cited

U.S. PATENT DOCUMENTS

| | | | | |
|---|---|---|---|---|
| 5,627,886 | A * | 5/1997 | Bowman | 379/111 |
| 6,772,334 | B1 * | 8/2004 | Glawitsch | 713/153 |
| 2003/0035370 | A1 * | 2/2003 | Brustoloni | 370/229 |
| 2003/0051155 | A1 * | 3/2003 | Martin | 713/201 |

OTHER PUBLICATIONS

"FOLDOC—IPSec", May 6, 2002, [Retrieved from Internet Aug. 30, 2004], "http://foldoc.doc.ic.ac.uk/foldoc/foldoc.cgi?IPsec".*
"IPSec", Jun. 15, 2001, [Retrieved from Internet Aug. 30, 2004], "http://www.forsitesolutions.com/Techstuff/freeswan/ipsec_overview.html".*
"Virtual Network Computing", Jan. 1998, [Retrieved from Internet Aug. 30, 2004], "http://www.uk.research.att.com/pub/docs/att/tr.98.1.pdf".*
Bruce Schneier, 1996, John Wiley & Sons, Inc., "Applied Cryptography", 75-76, 426, 455.*
A multilayer IP security protocol for TCP performance enhancement in wireless networks Yongguang Zhang; Selected Areas in Communications, IEEE Journal on vol. 22, Issue 4, May 2004 pp. 767-776.*
Analysis of tradeoffs between security strength and energy savings in security protocols for WLANs Prasithsangaree, P.; Krishnamurthy, P.; Vehicular Technology Conference, 2004. VTC2004-Fall. 2004 IEEE 60th vol. 7, Sep. 26-29, 2004 pp.: 5219-5223 V.*

(Continued)

*Primary Examiner*—David Jung
(74) *Attorney, Agent, or Firm*—Blakely, Sokoloff, Taylor & Zafman LLP

(57) ABSTRACT

A method and apparatus for establishing authenticated network (e.g., TCP/IP) connections augments the network (e.g., TCP/IP) protocol and enables concealment of the presence of network (e.g., TCP/IP) servers on the network. One methodology uses one or more cryptographic techniques, and/or combinations of such techniques, to achieve the goal. A network (e.g., TCP/IP) connection establishment could be authenticated using both shared secret cryptographic and public key cryptographic methods. The trust between peers could be established either directly or via a trusted third party. One methodology allows network (e.g., TCP/IP) server concealment against Internet based eavesdroppers and eavesdroppers staging man-in-the-middle attacks on the local network or in the close proximity to the server. The techniques described herein may be used to protect a network (e.g., TCP/IP) server from establishing unsanctioned connections from both local and remote networks.

86 Claims, 21 Drawing Sheets

OTHER PUBLICATIONS

A study of the elliptic curve cryptology applies to the next generation protocol Po-Hsian, H.; Ching-Wei, C.; Security Technology, 2004. 38th Annual 2004 International Carnahan Conference on Oct. 11-14, 2004 pp.: 233-238.*

* cited by examiner

ESTABLISHING AUTHENTICATED NETWORK CONNECTIONS

FIELD OF THE INVENTION

The present invention relates to providing network security to networks of any or arbitrary size from a single subnet to the Internet. In particular, this invention relates to authenticated establishment of a network (e.g., TCP/IP) connection during the initial (e.g., SYN—SYN/ACK—ACK) handshake of the network protocol.

BACKGROUND OF THE INVENTION

The Internet Protocol originated as a communications protocol for a small group of trusted peers. Since all peers on the network were a priory trusted, the Internet Protocol and its two protocol suites, TCP/IP and UDP, do not contain any provisions for transmission authentication or protection against eavesdropping.

The TCP/IP protocol is the most popular network protocol of the Internet. Its popularity is due mostly to TCP/IP's utilization by the http protocol—the transport medium of the World Wide Web. Typically, TCP/IP transmission security is achieved in the higher levels of the OSI protocol stack (e.g., the SSL/TLS protocol at the application transport level) or by tunneling a TCP/IP communications session over a special IP level protocol (e.g., the IPSec protocol).

Since the TCP/IP protocol does not provide any capabilities that selectively permit or deny access to a TCP/IP server, any entity on the Internet is free to establish a connection to such server. A TCP/IP connection between two peers is established via a three-way handshake sub-protocol. During this interaction, communicating parties establish parameters of the TCP session to follow.

In order to initiate a new TCP/IP session, a peer who initiates the session (e.g., the client) transmits a special SYN TCP control packet to the target peer (e.g., the server). The SYN packet tells the server to synchronize packet exchange sequence numbers and contains the initialization parameter of a new work session, referred to as the client sequence number. The server responds to the client with another special control packet, called SYN/ACK, which acknowledges receipt of the session initiation packet and establishes the server side parameter of the TCP/IP session, referred to as the server sequence number. Upon receipt of the SYN/ACK packet, the client completes the TCP session establishment by transmitting the ACK control packet to the server, thus acknowledging the validity of the server sequence number established in the SYN/ACK packet. Once this connection establishment phase is complete, the peers may start exchanging data. A TCP/IP session is terminated when both peers transmit a control FIN packet and both sides acknowledge session termination by responding with a control ACK packet.

While being a necessary prerequisite to establishing a work session, this three way stateful initiation of the TCP/IP session allows malicious parties to determine the presence of a TCP/IP server on the network and to stage attacks against them. The first phase of a network-based attack is called "scanning" and consists of sending a SYN, a FIN, an ACK or a data packet to a suspected network location of a TCP/IP server, and then observing or not observing a return ACK or RST packet. Once the server is discovered, it is "fingerprinted", i.e. the attacker identifies the type of software that provides the service. Once the type of software is determined, the attacker may use freely available tools to subvert, infiltrate, or crash the server. The assailant can also stage a special type of attack, called "Denial of Service" (DoS) attack, which floods a server with unanswered connection requests, e.g., a SYN Flood.

SUMMARY OF THE INVENTION

A method and apparatus is disclosed herein for authenticating network connections. In one embodiment, the method comprises authenticating a prospective peer on the network prior to establishing a network connection.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
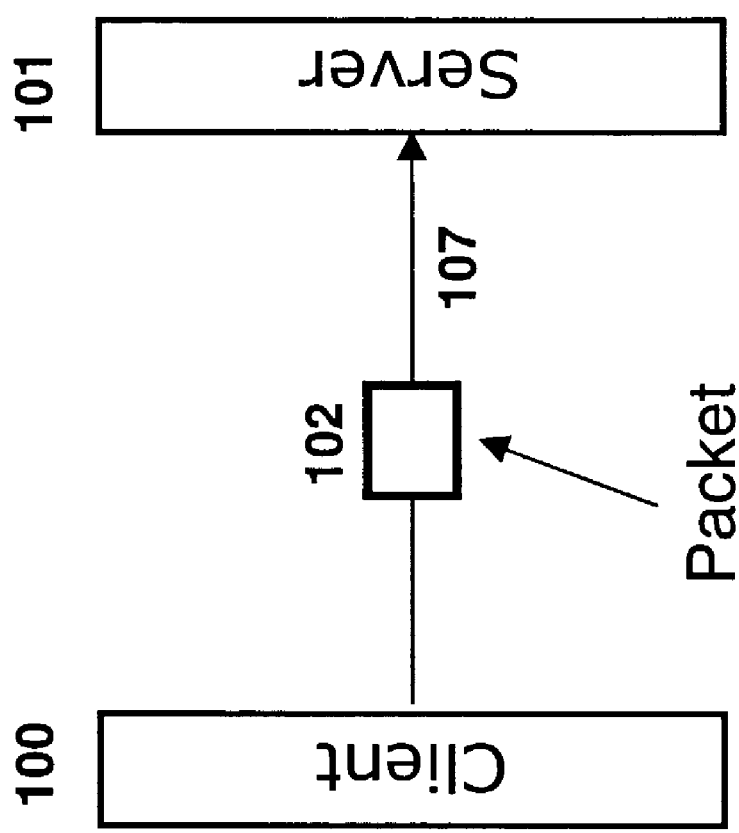
FIG. 1 is a block diagram showing a small local network with unobstructed path between the host computers.

An efficient way to provide security for a TCP/IP server on a network is to limit access to it to a reasonably small group of trusted peers and render it invisible to other network entities. This protection could be achieved if the initial phase of any TCP/IP connection to the server, i.e., the three-way connection establishment handshake (SYN—SYN/ACK—ACK), is safeguarded.

Authenticating establishment of TCP/IP connections in a network is described. In one embodiment, the authenticating establishment occurs during an initial three-way handshake. In one embodiment, this invention augments, but does not amend, the TCP/IP protocol in any fashion. As a consequence, this invention enables concealment of the presence of TCP/IP servers on the network from, and thus prevents access by, any and all unauthorized parties. In one embodiment, cryptographic techniques and combinations of such techniques may be used to achieve the goal. A TCP/IP connection establishment could be authenticated using both shared secret cryptographic methods and public key cryptographic methods. The trust between peers could be established either directly or via a trusted third party.

The invention may be used to conceal a TCP/IP server against Internet-based attackers and parties staging man-in-the-middle ("MITM") attacks on the local network or in close proximity to the TCP/IP server. The invention may be used to protect a TCP/IP server from establishing unsanctioned connections which originate from either local or remote networks.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 illustrates an example of a small network subnet on which the client computer 100 establishes a direct network connection to the server computer 101. The term "Host" may refer either to a client computer 100 or to a server computer 101. The connection is established by exchanging of one or more of packets 102. When both computers are located on the same subnet, the packets are simply transferred over the communication lines 107 of the subnet without any modification.

Figure 2:
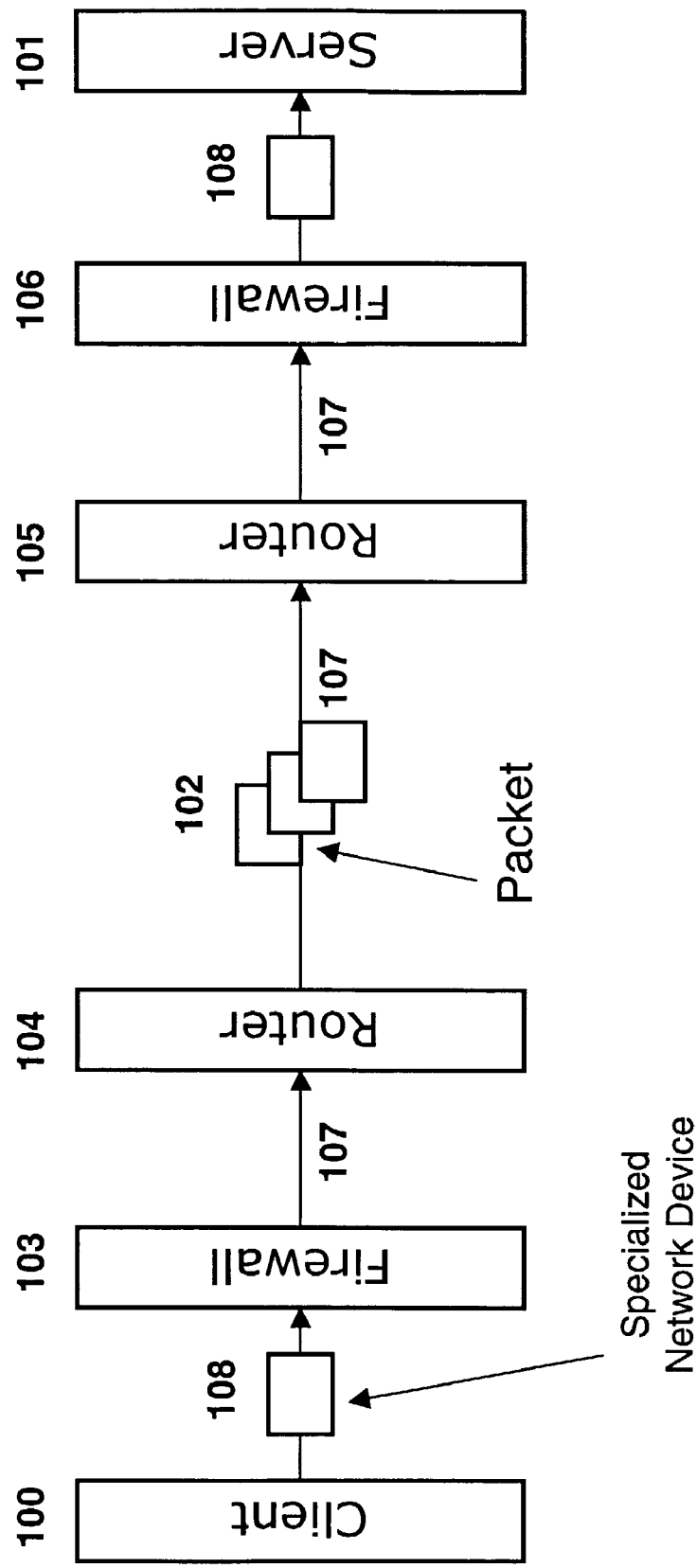
FIG. 2 is a block diagram showing a larger network with a number of network devices on the communications path between the host computers.

FIG. 2 shows an example of large network on which client computer 100 establishes a network connection to the server computer 101. Packets 102 are routed through one or multiple network devices that may amend the control and the data portion of packet 102, performing network address translation operations and data encapsulation operations. The connection is established via one or more client side firewalls 103, and/or one or more routers or other network devices 104–105, and/or one or a plurality of firewalls on the server side 106, and/or one or a plurality of specialized network devices 108 such as, without limitation, switches, IPSec gateways, etc.

Referring to FIG. 2, packets 102 may be generated and transmitted between client computer 100 and the server computer 101 in accordance with a protocol suite such as IP or IPX or a transport layer protocol suite such as TCP/IP or SPX.

Figure 3:
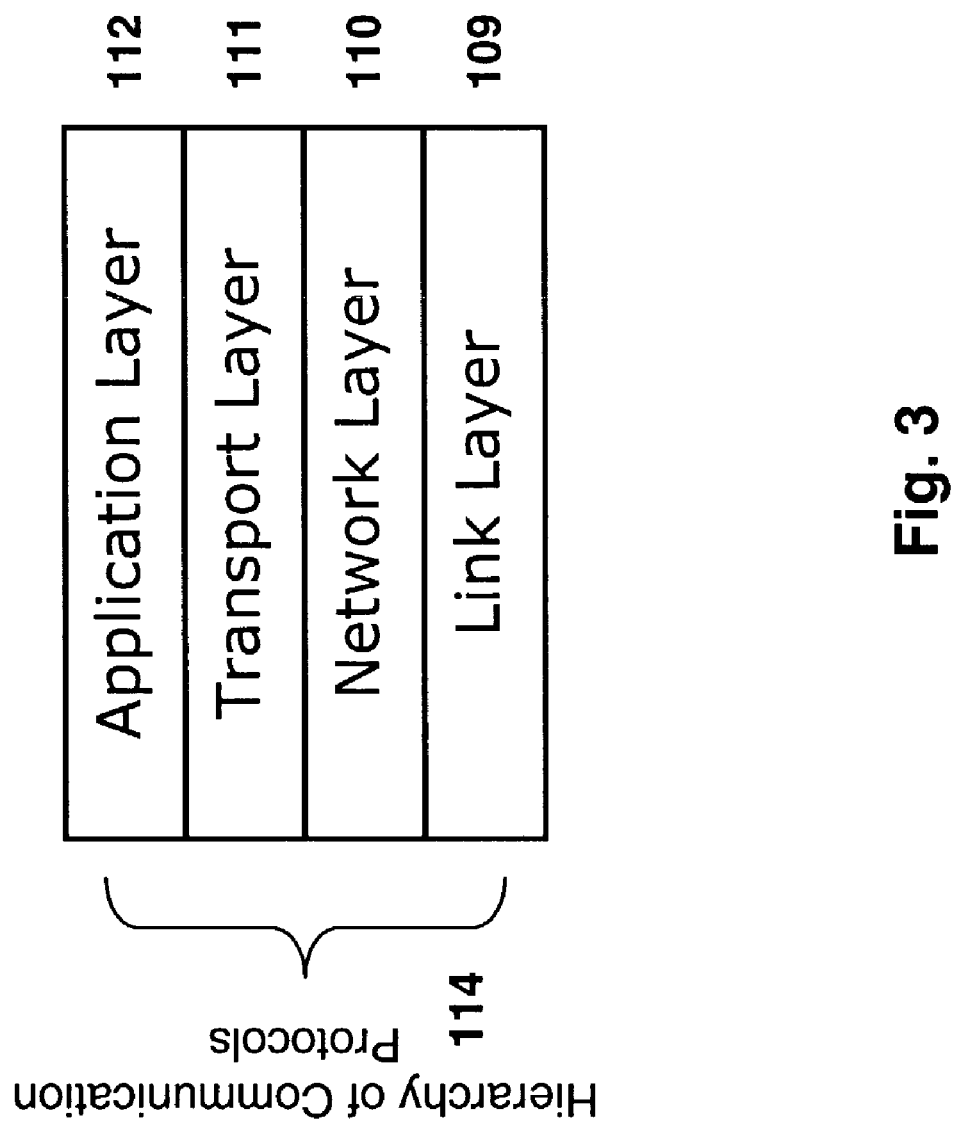
FIG. 3 shows a hierarchy of the communications protocols (partial "OSI Protocol Stack") residing on the host computers.

FIG. 3 illustrates a hierarchy of communication protocols 114. Application layer 112 contains the data which two applications residing on client computer 100 and server computer 101 are exchanging. HTTP, SSL, FTP, and Telnet are examples of application layer protocols 112. Transport layer 111 protocols are typically responsible for the reliable delivery and integrity of the exchanged data. The TCP/IP and the IPX/SPX protocols are examples of transport layer 111 protocols. Information transmitted in network layer 110 is responsible for routing packets through the networks between client computer 100 and server computer 101. IP and IPX are examples of network layer 110 protocols. Link layer 109 protocols, such as Ethernet and Token Ring, physically provide packets to client computer 100 and server computer 101.

Figure 4:
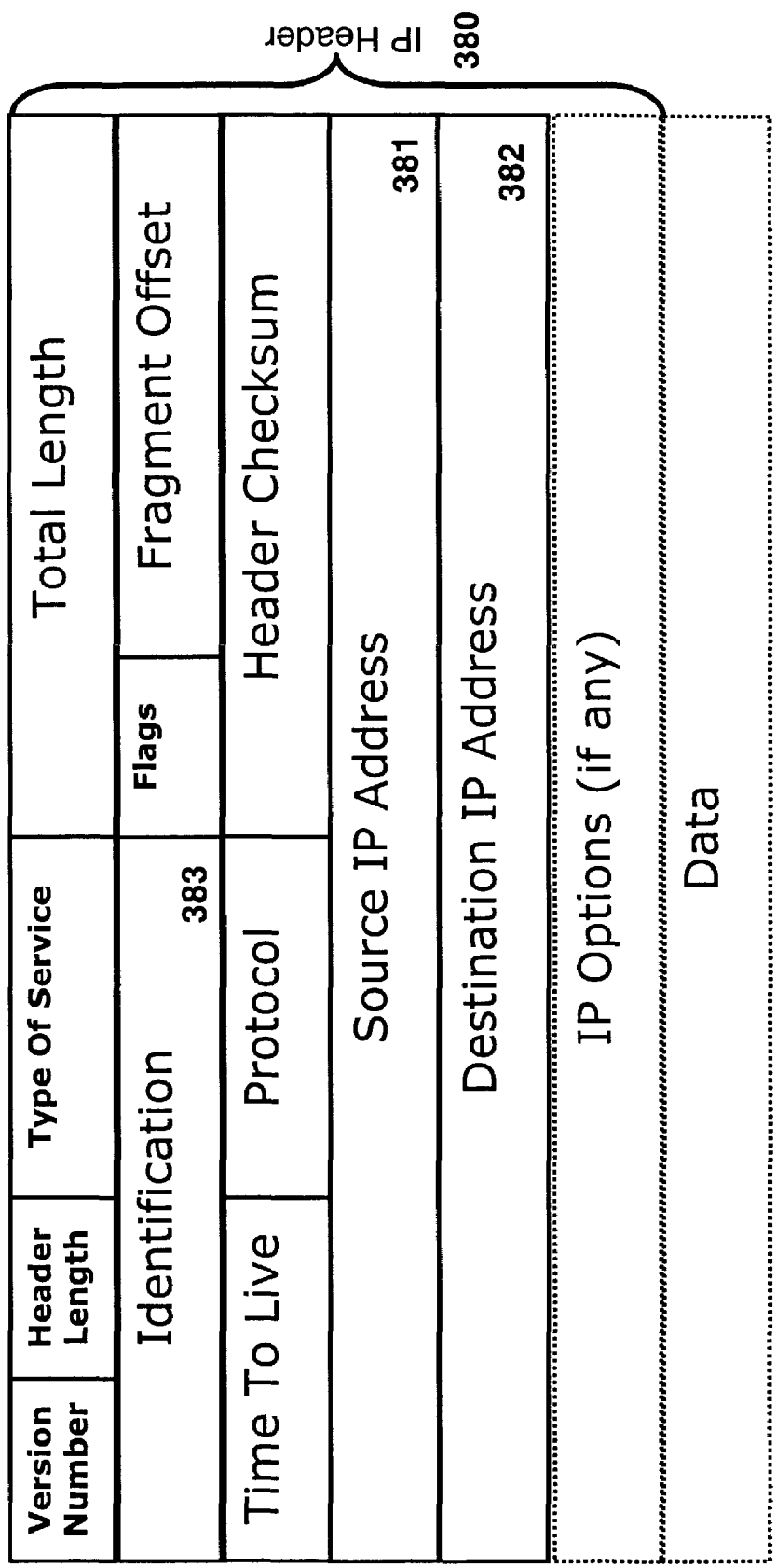
FIG. 4 shows a layout of the IP header.

FIG. 4 is the layout of the IP Network Layer Protocol Header ("IP Header") 380. IP header 380 is transmitted in every packet exchanged by client computer 100 and server computer 101.

In one embodiment, IP header 380 is comprised of the version number, header length, and total length fields. Identification field 303 and the fragment offset field are used for reassembly of fragmented packets. The time-to live field is used to limit the number of routers through which a packet can pass. The protocol field identifies a transmission protocol encapsulated in the IP packet, e.g., the protocol number for TCP is 6. The header checksum field value is calculated over the IP header 380 and is used by the receiving host to check the integrity of the IP header 380. Source IP address 381 and the destination IP address 382 fields are used to identify the sending and the receiving hosts.

Figure 5:
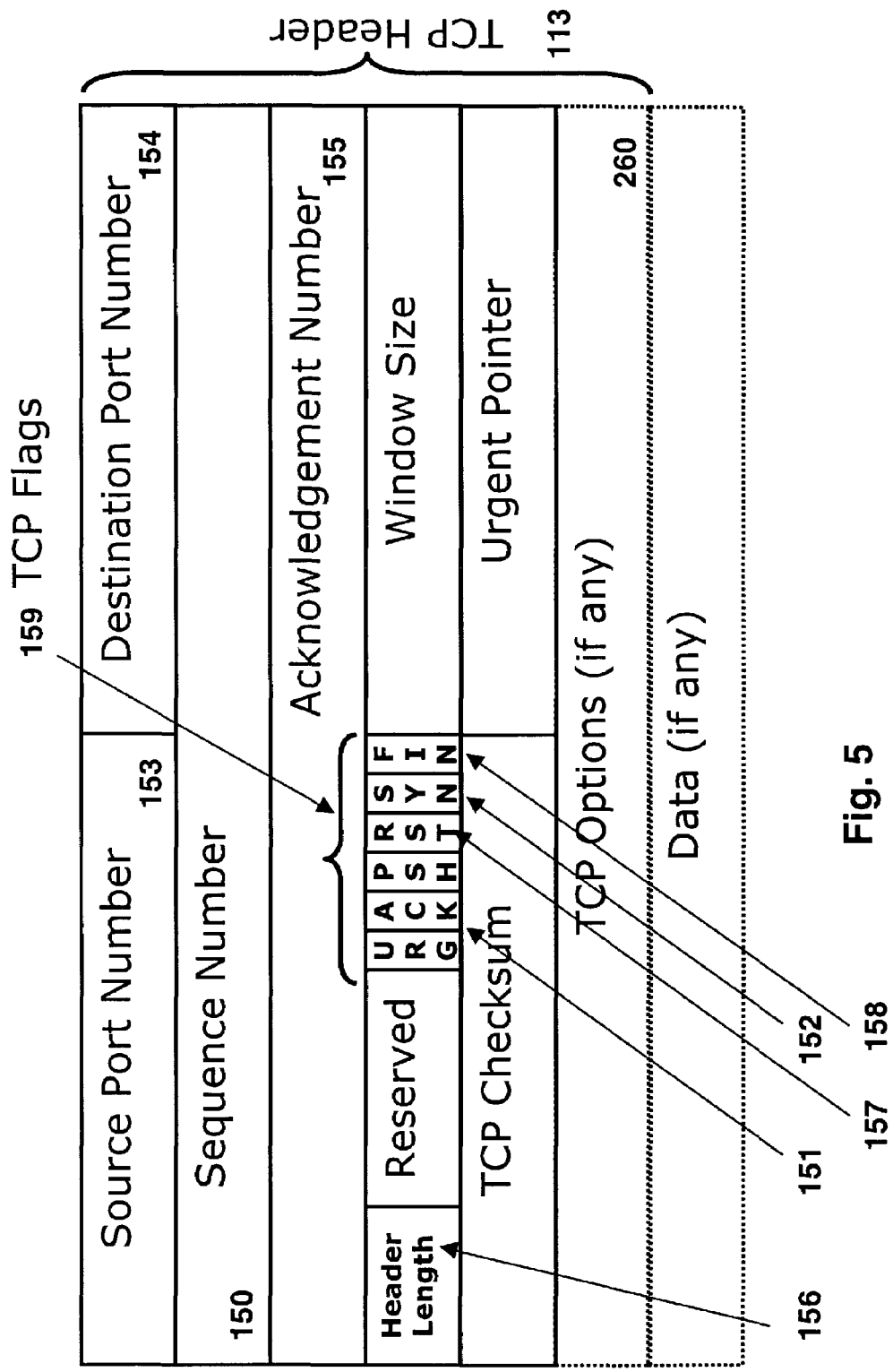
FIG. 5 shows a layout of the TCP header.

FIG. 5 is the layout of the TCP/IP Transport Layer Protocol Header ("TCP Header") 113. TCP header 113 is transmitted in every packet exchanged by client computer 100 and server computer 101.

In one embodiment, TCP header 113 contains source port number 153 and destination port number 154 to identify the sending and receiving application. Sequence number 150 identifies which octet in the stream of data from the sending host to the receiving host that the first octet of data in the segment represents. Acknowledgement number 155 contains the next sequence number that the sender of the acknowledgement is expecting to receive. Header length 156 gives the length of TCP header 113 in 32-bit words. There are six TCP flags 159:

URG—the urgent pointer is valid
ACK—the acknowledgement number is valid (151)
PSH—send data to the application as soon as possible
RST—reset connection (157)
SYN—initiate connection (152)
FIN—the sender finished sending the data (158)

The window size is used for data flow control. TCP checksum covers the entire TCP segment (TCP header 113+data). The URG flag indicates that the urgent pointer value is set to point to the offset of the urgent data in the TCP stream. If the URG flag is not set, the urgent pointer value is undefined.

In one embodiment, the fixed portion of TCP header 113 is 20 octets long. TCP header 113 also contains zero, or one or more options. TCP options 260 are used to provide information that is only relevant during certain stages of the TCP connection lifetime and does not need to be repeated in every packet. Thus, for example, MSS (Maximum Segment Size) value is sent during the establishment of connection. TCP options 260 may also be used to specify capabilities of the host TCP implementation that go beyond the TCP/IP standard requirements, e.g., "selective acknowledgement".

Figure 6:
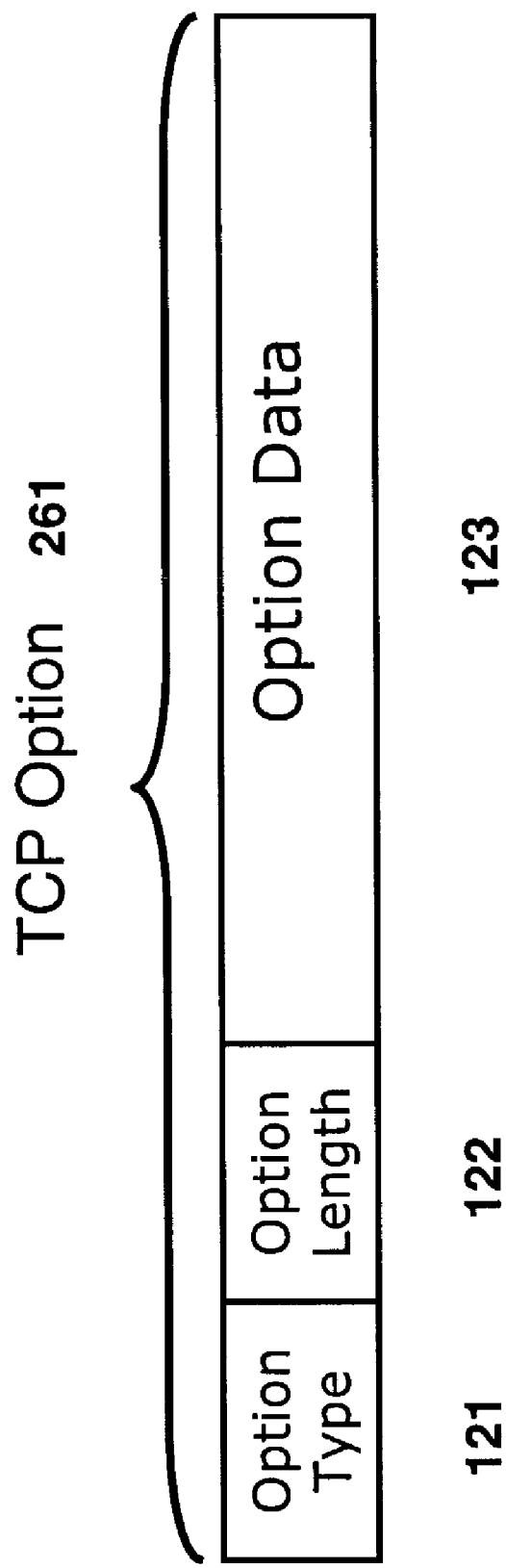
FIG. 6 shows a layout of a TCP option.

FIG. 6 is an exemplary layout of TCP option 261. It consists of option type octet 121, option length octet 122, and option data 123. In one embodiment, TCP option 261 is padded to a multiple of 4 octets by a "No Operation" TCP option.

Figure 7:
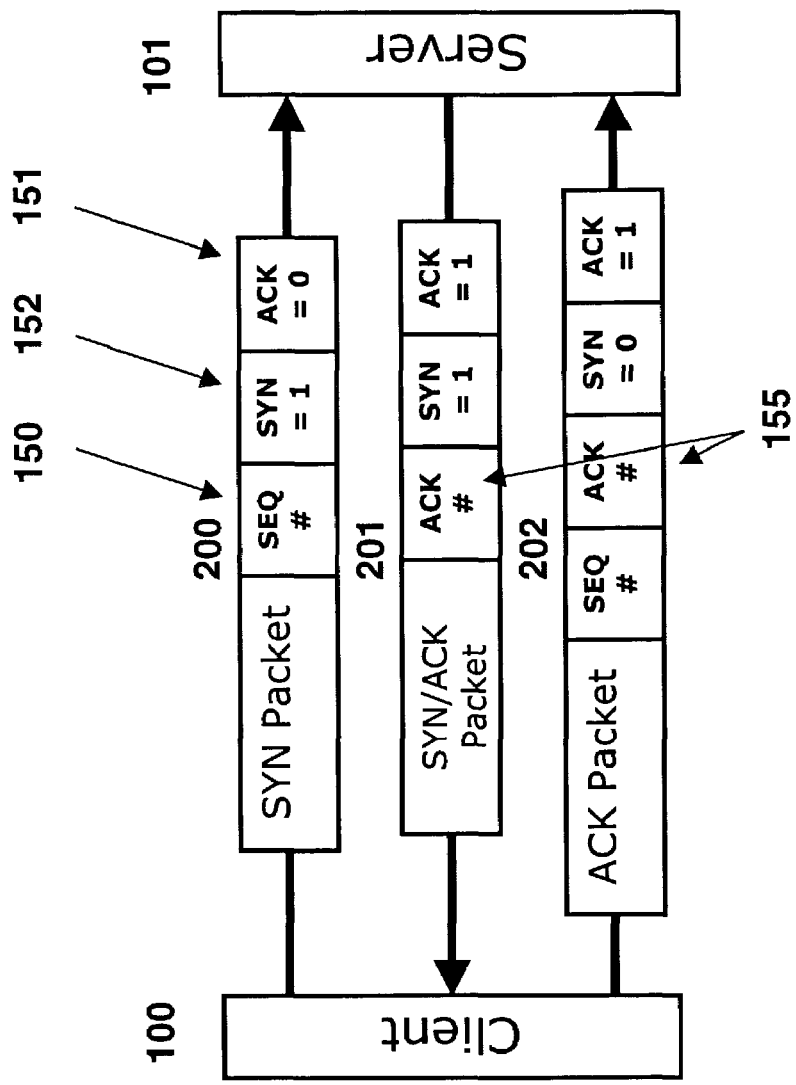
FIG. 7 illustrates a three-way handshake during a TCP connection establishment.

FIG. 7 illustrates a handshake between peers during establishment of a TCP connection. Referring to FIG. 7, when a new TCP/IP connection is being established the initiator sends a SYN packet 200 with a SYN flag 152 turned on, the ACK flag 151 turned off and sequence number 150 set to the initial sequence number chosen by the host. If the responding host is accepting the connection, it replies with a SYN/ACK packet 201 in which SYN flag 152 is turned on, ACK flag 151 is turned on, and acknowledgement number 155 is set to equal the initiator's sequence number 150 value plus one, to indicate acknowledgement of the first SYN packet 200. Upon receiving SYN/ACK packet 201, the initiator responds with a final packet ("ACK packet" 202) of the initial three-way handshake in which ACK flag 151 is set, and acknowledgement number 155 is equal to sequence number 150 of the responder's packet plus one. After the three-way exchange is complete, a new TCP connection is established.

Figure 8:
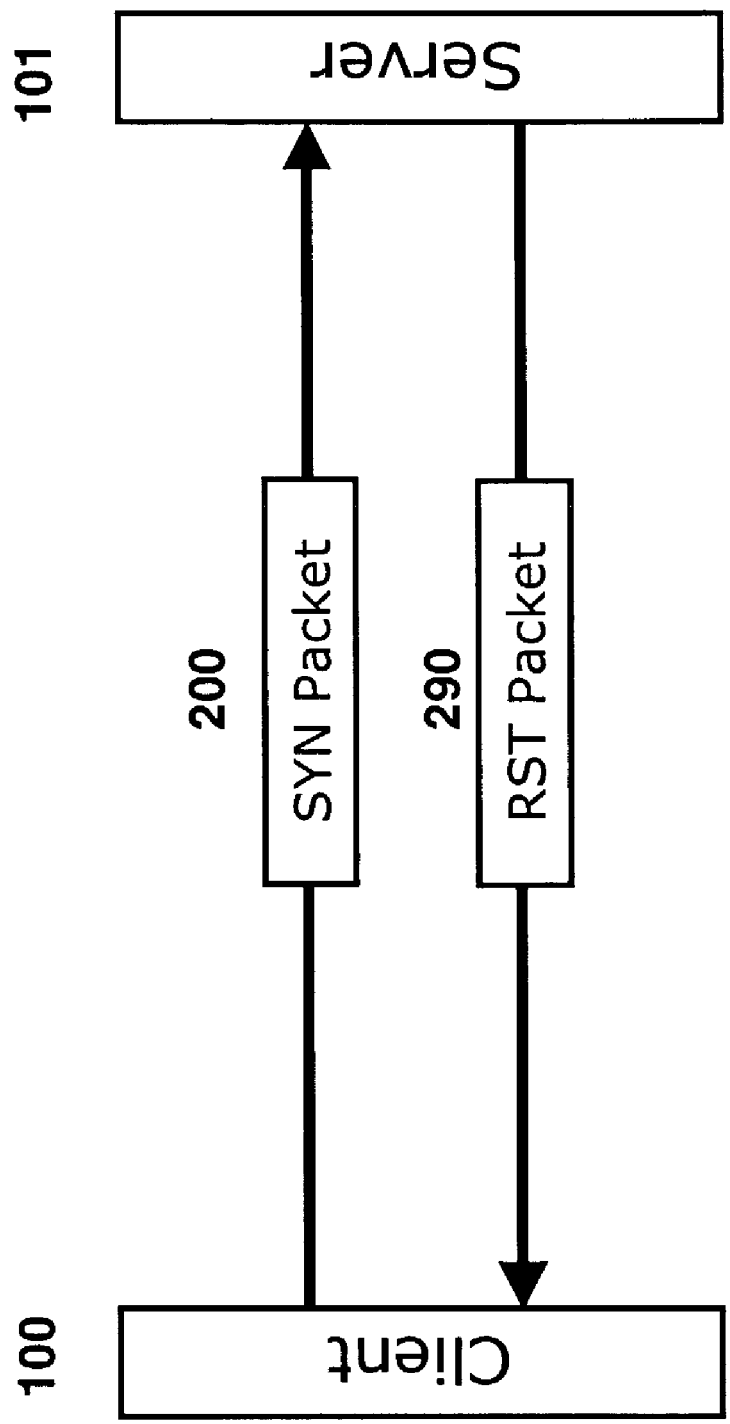
FIG. 8 illustrates a failed connection attempt when required TCP service is unavailable.

FIG. 8 illustrates when a TCP connection attempt fails due to the fact that requested TCP service, as defined by destination port, is not available on server computer 101. Server computer 101 responds with the RST packet 290 with the RST flag set to indicate that the connection is rejected.

Figure 9:
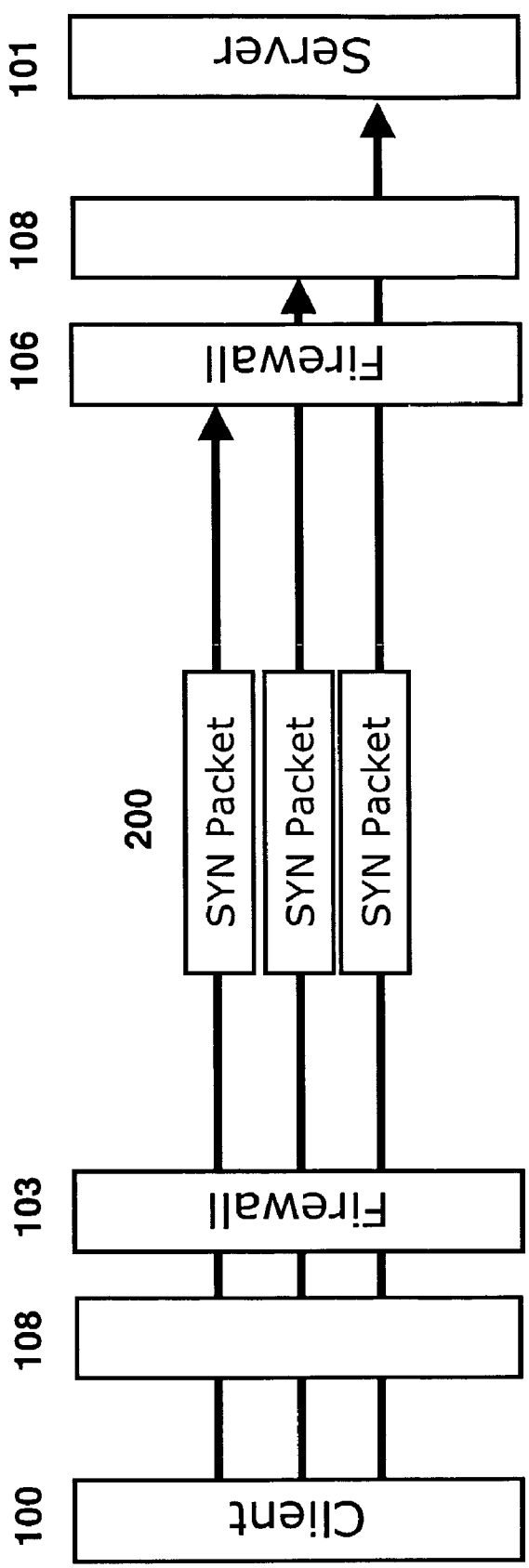
FIG. 9 illustrates a failed connection attempt because the destination server computer is not present or because a firewall or other policy enforcement device does not permit the connection.

FIG. 9 illustrates when a TCP connection attempt fails because the destination server computer 101 is not present, or because a firewall 103 or 106 or other policy enforcement device 108 does not permit the connection. Client computer 100 sends SYN packet 200 and does not get any response. Client computer 100 retries the connection attempt a few times before giving up and reporting an error condition up the hierarchy of communication protocols 114.

Authenticated SYN and an Exemplary Authentication Data Layout

Figure 10:
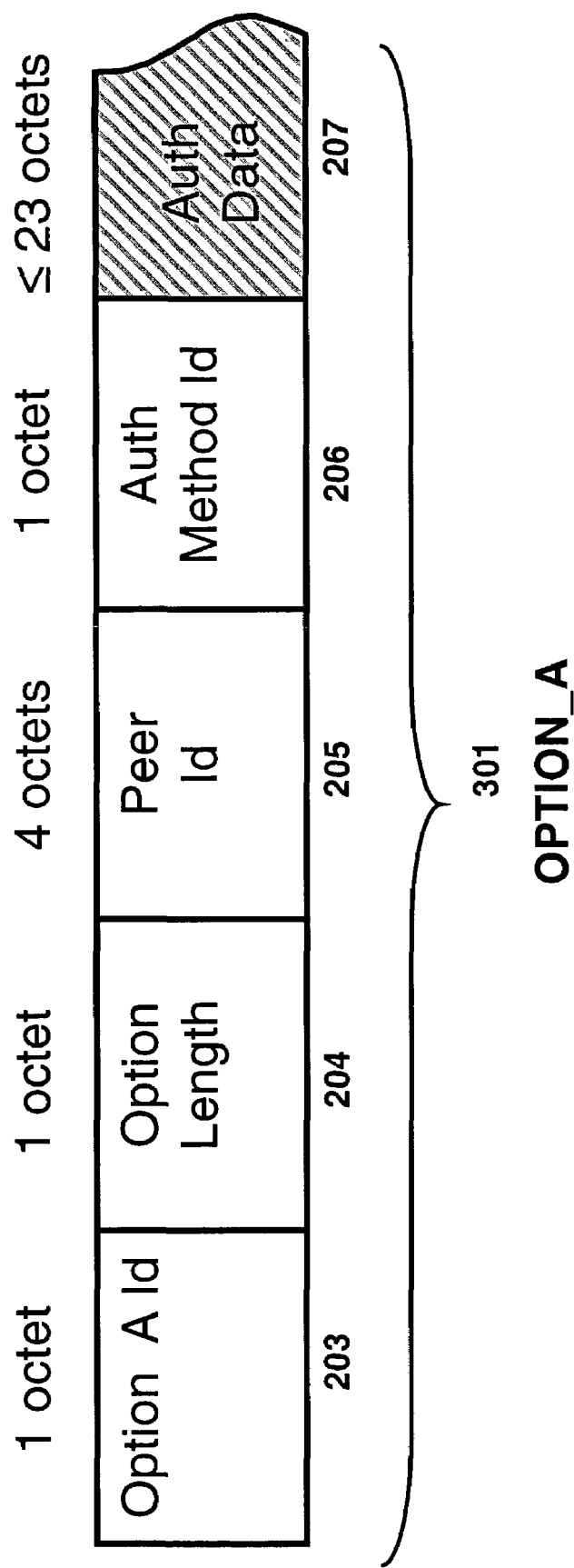
FIG. 10 shows an exemplary layout of the TCP authentication option.

In order to selectively prevent the establishment of unauthorized TCP/IP connections, novel measures are taken. FIG. 10 illustrates a single instance of a special TCP option 261, OPTION_A 301, that is added to SYN packet 200. In one embodiment, OPTION_A 301 is comprised of an octet which contains the option A Id 203; an octet containing option length 204; and followed immediately by four octets containing peer Id 205 of client computer 100 at server computer 101 site. The octet following peer Id 205 contains a unique identifier of the authentication method, auth method Id 206, which is used to authenticate client computer 100.

Octets following auth method Id 206 contain authentication data, auth data 207. In one embodiment, auth data 207 length is limited to approximately 23 octets due to the size limitation of the TCP header 113.

An Alternative Authentication Data Layout

Figure 11:
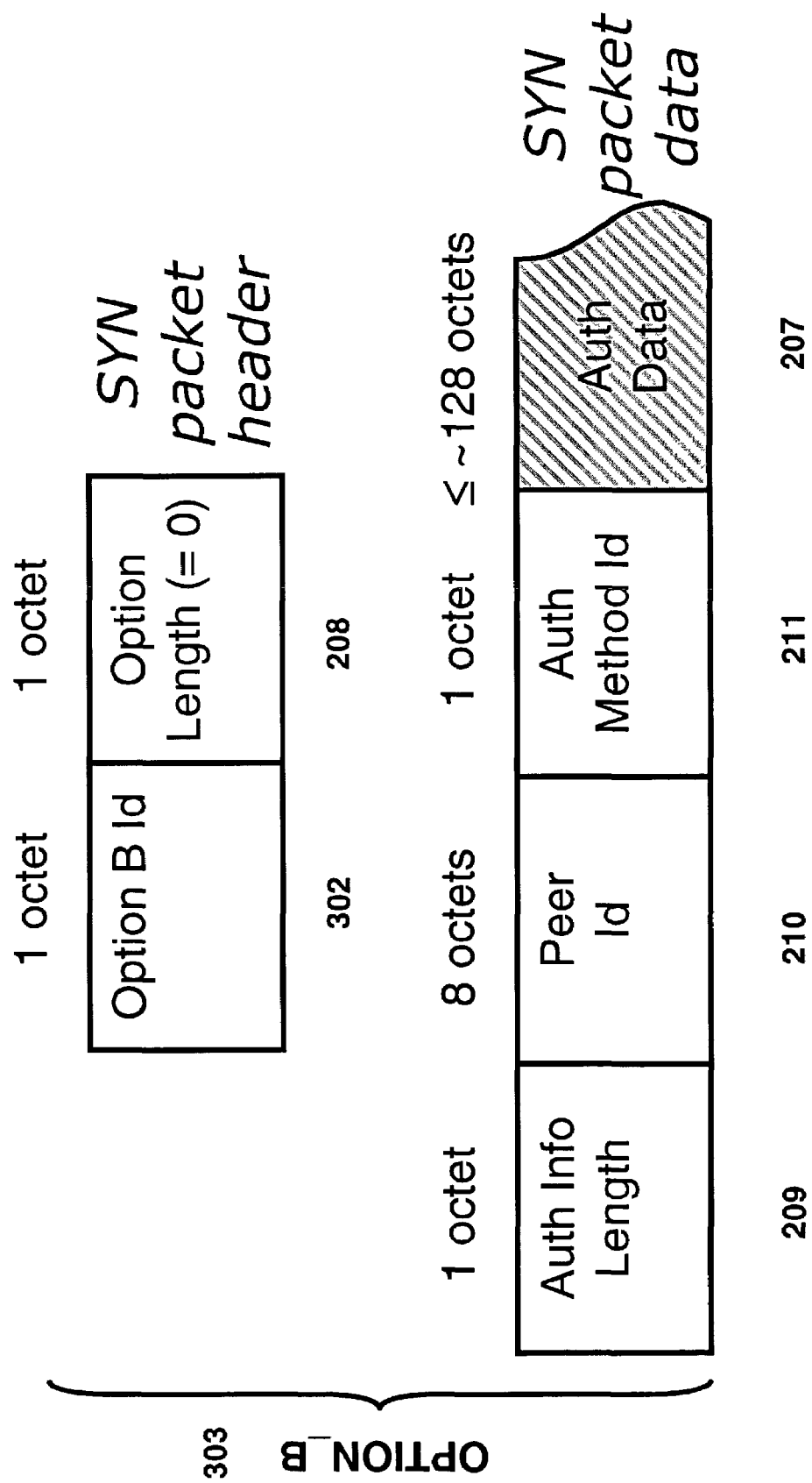
FIG. 11 shows an alternative layout of the TCP authentication option.

In another embodiment, as illustrated on FIG. 11, a single instance of a special TCP option 261, OPTION_B 303, is added to SYN packet 200. In one embodiment, OPTION_B 303 is comprised of an octet that contains the option B Id 302 and option length 208 octet set to zero, indicating that length of the following TCP option 261 data is 0.

When OPTION_B 303 is used, authentication information is placed in the data portion of SYN packet 200. Authentication information begins with a single octet auth info length 209 containing total length of the peer Id 210, auth method Id 211 and auth data 207 fields. This octet is followed immediately by eight octets containing peer Id 210 for client computer 100 at the site of server computer 101.

The following octet, auth method Id 211, contains a unique identifier of the authentication method used to authenticate client computer 100 by server computer 101. Octets following auth method Id 211 contain authentication data in auth data 207. In one embodiment, auth data 207 length is limited to approximately 128 octets due to the data size limitation of the TCP/IP packet.

Maintaining Session Context and Preventing FIN Scan

Sending a SYN packet to a TCP/IP server is not the only method to discover a network service. Activity in which a party tries to locate services available on a network is called "scanning". Typically, scanning is performed by sending SYN packets to the ports of the hosts deployed on the network. This type of scanning is called "SYN-scan".

In addition to SYN-scan, a sophisticated attacker can utilize FIN, ACK or NULL scans. These scans send an unsolicited packet with the respective TCP flag set, as denoted by the name of the scan. Packets sent during these scans are not a part of any valid established TCP connection. The TCP/IP protocol requires the host that receives one of those packets to generate a response, RST packet 290, if the TCP port was closed, and to ignore the packet if the TCP port was open. This behavior, prescribed by the TCP/IP protocol standard, allows the attacker to determine which TCP ports are open on a target Host.

In order to prevent open TCP port detection by FIN, ACK or NULL scans, in one embodiment, the server computer 101 tracks all established TCP connections. The host computer generates an RST Packet 290 in response to any packet sent to an open TCP port that does not belong to a valid TCP connection. Providing the same response to packets sent to an open TCP port and to a closed TCP port denies attacker any useful information.

Authentication Methods

Before attempting the establishment of an authenticated TCP/IP connection, client computer 100 and server computer 101 agree on the type of authentication method that they will use for authentication purposes. Various embodiments include, but are not limited to, the following authentication methods:

cryptographic hashed message authentication code (HMAC);
cryptographic hash with timestamp;
one time password;
public key cryptography-based;
based on security assertion provided by a trusted third party.

Each of these authentication methods includes a variation that introduces additional authentication steps designed to prevent the "man-in-the-middle" (MITM) attacks against the protected server computer 101.

The MITM Attack and How it is Mitigated

Figure 12:
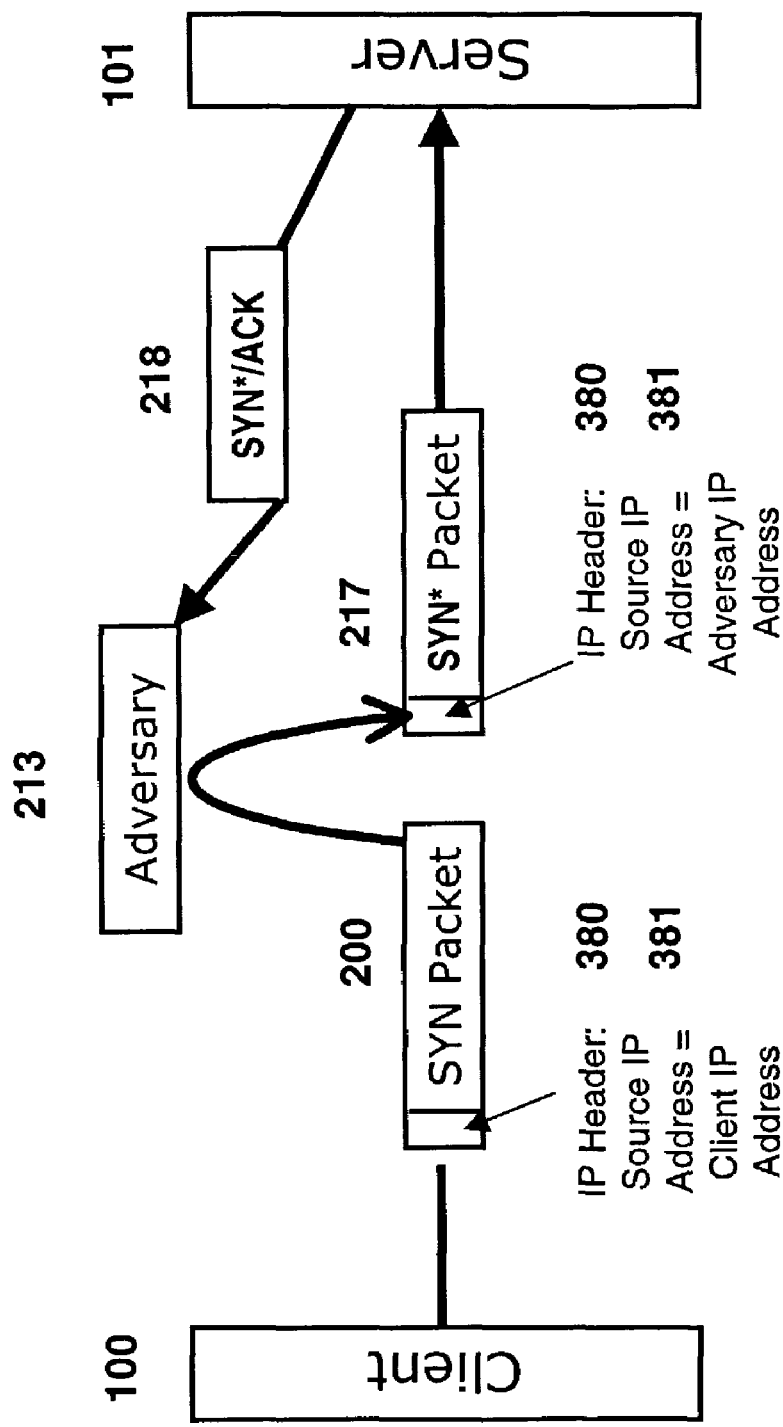
FIG. 12 illustrates a "man-in-the-middle" attack.

As illustrated on FIG. 12, a powerful adversary 213 may position itself on the network on the route of TCP/IP connection initiation, SYN packet 200 sent by client computer 100 to server computer 101. Adversary 213 is capable of changing the original source address 381 field value in the IP header 380 of SYN packet 200 to the adversary's IP address.

As a consequence of such action by adversary 213, upon receiving the amended SYN* packet 217, server computer 101 verifies authentication data in the amended SYN* packet 217 if that authentication data did not include a cryptographically protected reference to the IP address of client computer 100. Given the fact that in a large number of deployments, the source IP address cannot be verified due to the widespread use of Network Address Translation (NAT) technology by network perimeter devices, an MITM attack could be successfully staged by adversary 213.

A successful MITM attack against server computer 101 forces it to send a response SYN*/ACK packet 218 to adversary 213 instead of to client computer 100. As a result, server computer's TCP/IP session is diverted to adversary 213.

Figure 13:
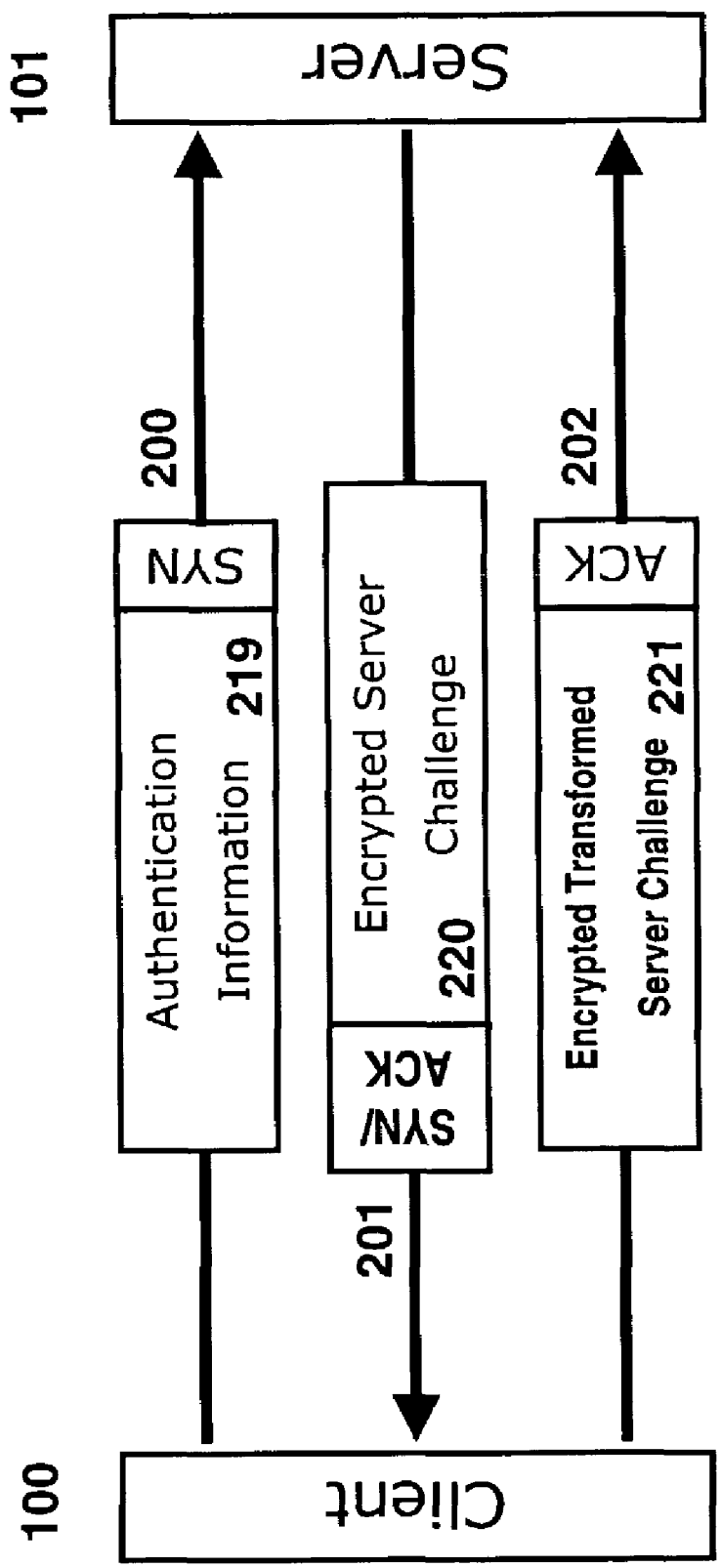
FIG. 13 illustrates exemplary information flow during optional fully authenticated three-way TCP handshake.

Special variations of the authentication methods include provision for a challenge response exchange between client computer 100 and server computer 101 to further verify the source of the nascent TCP/IP session prior to the establishment of any connection. As illustrated on FIG. 13, upon receiving the SYN packet 200 with authentication information 219, server computer 101 uses a shared secret key or a public key of the client computer 100 to encrypt a randomly generated octet sequence, i.e. the challenge. Server computer 101 places the challenge in the response SYN/ACK packet 220 and sends it to client computer 100. Upon receiving the SYN/ACK packet 220, client computer 100 decrypts the challenge using a shared secret key or a private key, transforms it according to an established algorithm, and encrypts it with a shared secret key or with the public key of server computer 101. Next, client computer 100 sends an encrypted transformed challenge back to server computer 101 in the ACK packet 202 with encrypted transformed server challenge 221. Upon receiving ACK packet 202 with encrypted transformed server challenge 221, server computer 101 decrypts the transformed challenge and verifies that client computer 100 transformed the challenge correctly.

An Exemplary Challenge Data Layout in SYN/ACK

Figure 14:
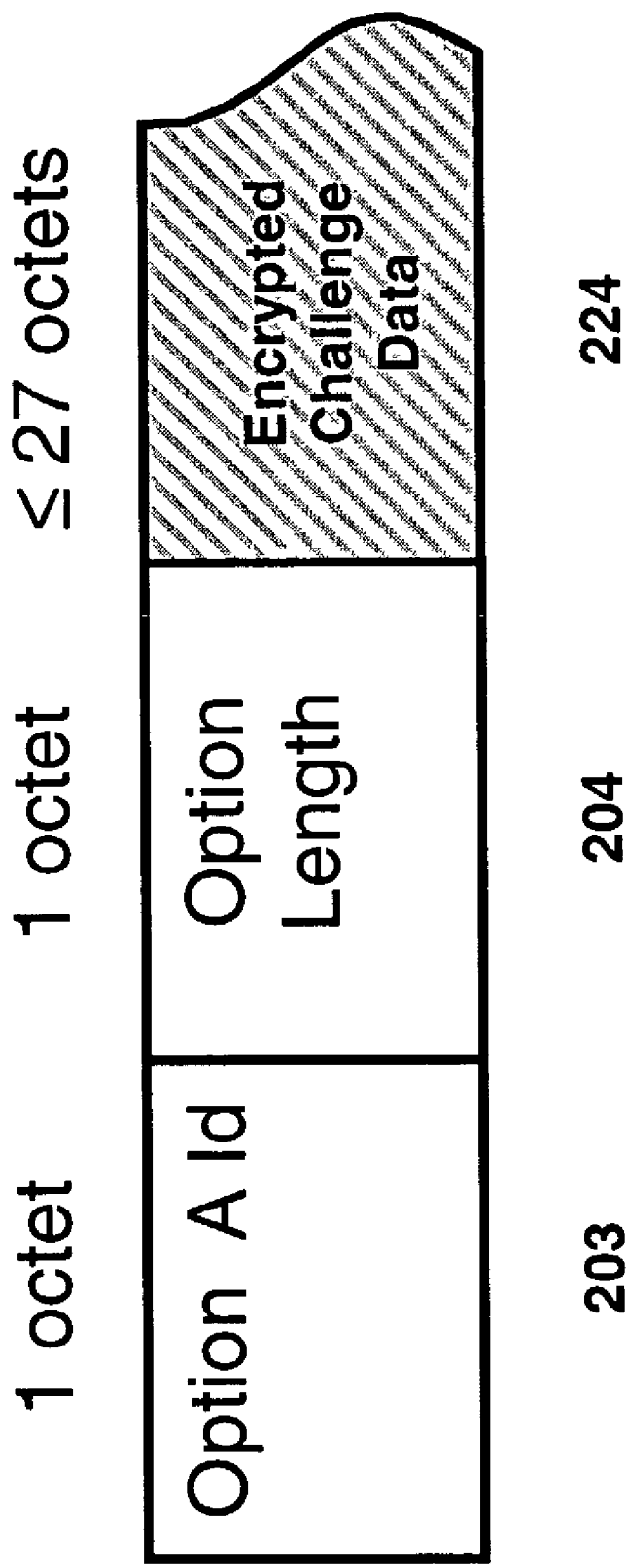
FIG. 14 shows an exemplary layout of the TCP authentication option data in the optional challenge phase.

FIG. 14 shows one embodiment of the challenge data layout in the SYN/ACK packet 201 sent by server computer 101 to client computer 100. A single instance of a special TCP option 261, OPTION_A 301, is added to SYN/ACK packet 201. In one embodiment, OPTION_A 301 is comprised of an octet that contains option A Id 203, followed by an octet indicating the length of the following TCP/IP option 261 data, option length 204. Encrypted challenge information, encrypted challenge data 224, immediately follows option length 204. The length of encrypted challenge data 224 depends on the type of authentication algorithm in use. In one embodiment, authentication data length is limited to approximately 27 octets due to the size limitation of the TCP header 113.

Figure 15:
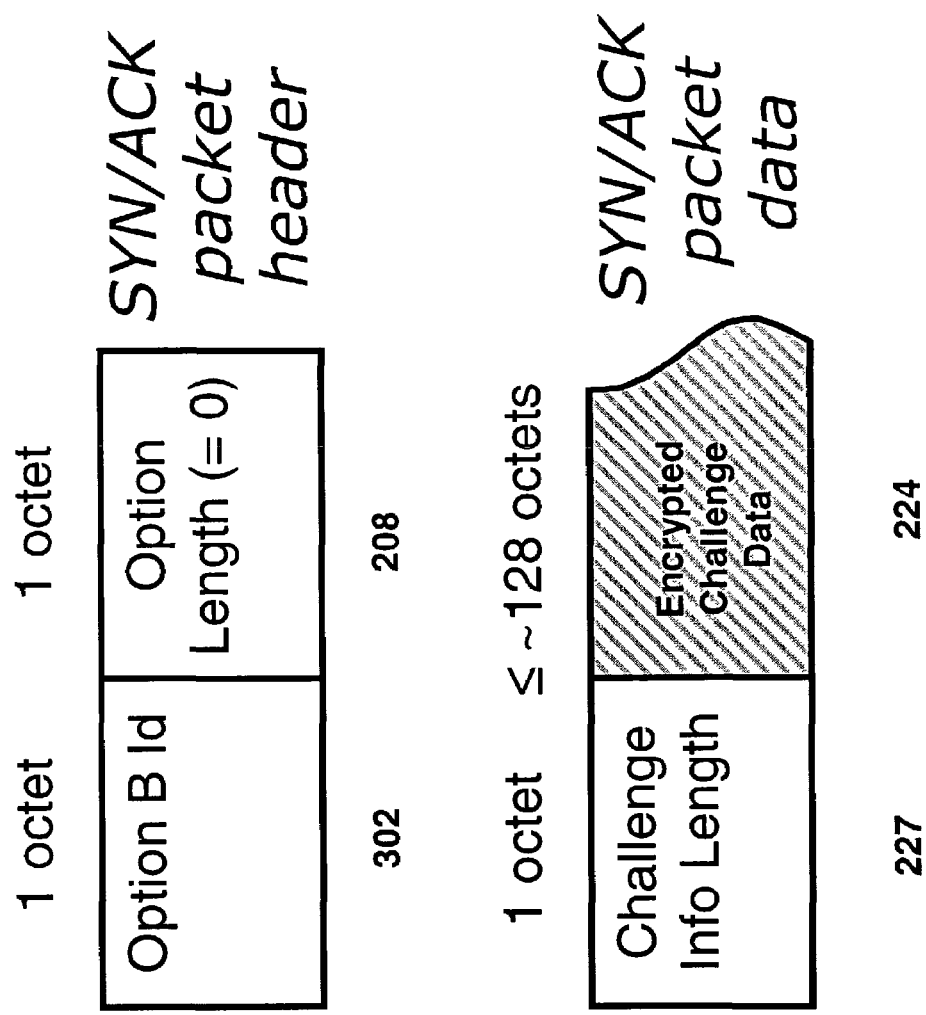
FIG. 15 shows an alternative layout of the TCP authentication option data in the optional challenge phase.

In another embodiment, as illustrated on FIG. 15, a single instance of a special TCP option 261, OPTION_B 303, is added to SYN/ACK packet 201 sent by server computer 101 to client computer 100. In one embodiment, OPTION_B 303 is comprised of an octet that contains option B Id 302, followed by a zero octet, option length 208, which indicates that length of the following TCP/IP option 261 data is 0. When OPTION_B 303 is used, encrypted challenge information is placed in the data portion of SYN/ACK packet 201.

Encrypted challenge information begins with a single octet, challenge info length 227, containing the length of the following encrypted challenge information. Octets following challenge info length 227 contain encrypted challenge data 224. In one embodiment, challenge data length is limited to approximately 128 octets due to the size limitation of the TCP/IP packet data size.

Response Data Layout in ACK

Figure 16:
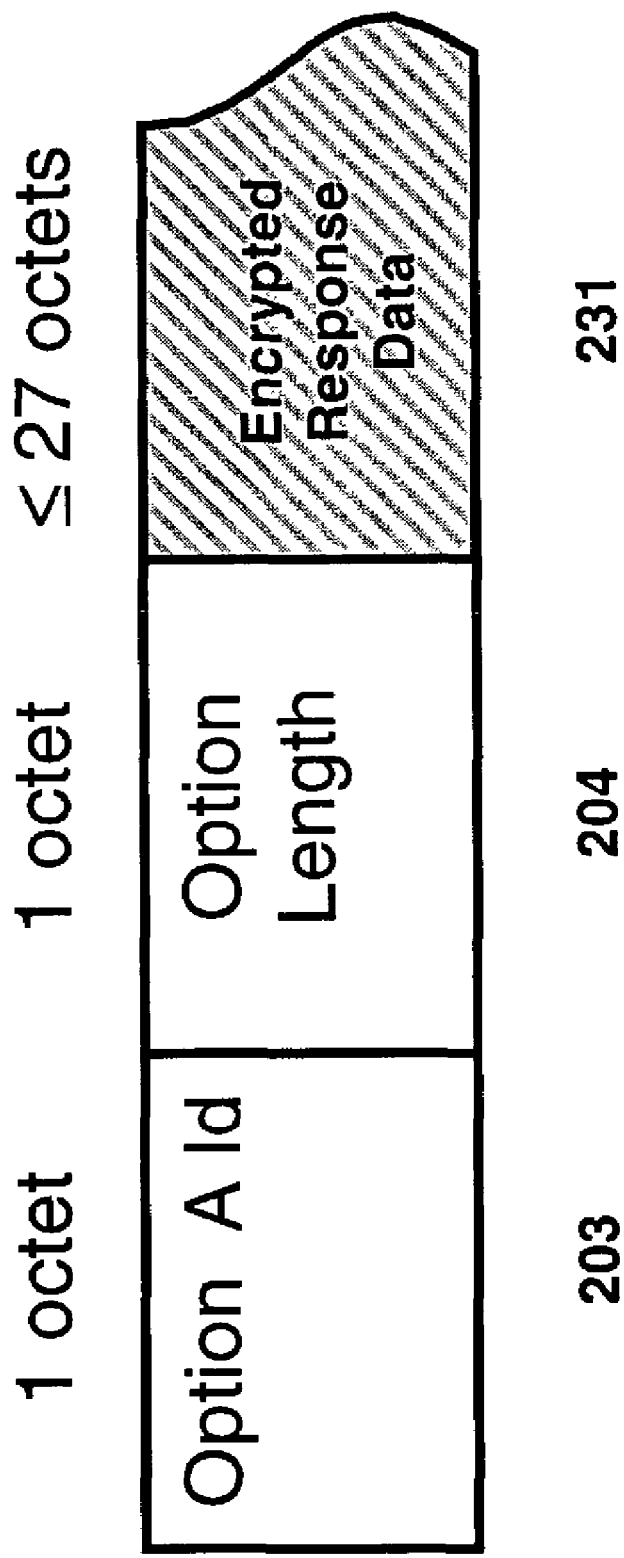
FIG. 16 shows an exemplary layout of the TCP authentication option data in the optional response phase.

FIG. 16 shows one embodiment of the response data layout in the ACK packet 202 sent by client computer 100 to server computer 101. A single instance of a special TCP option 261, OPTION_A 301, is added to ACK packet 202. In one embodiment, OPTION_A 301 is comprised of an octet that contains the option A Id 203, followed by an octet indicating the length of the following TCP/IP option 261 data, option length 204. Encrypted response information, encrypted response data 231, immediately follows option length 204. The length of encrypted response data 231 depends on the type of authentication algorithm in use. In one embodiment, authentication data length is limited to approximately 27 octets due to the size limitation of the TCP header 113.

Figure 17:
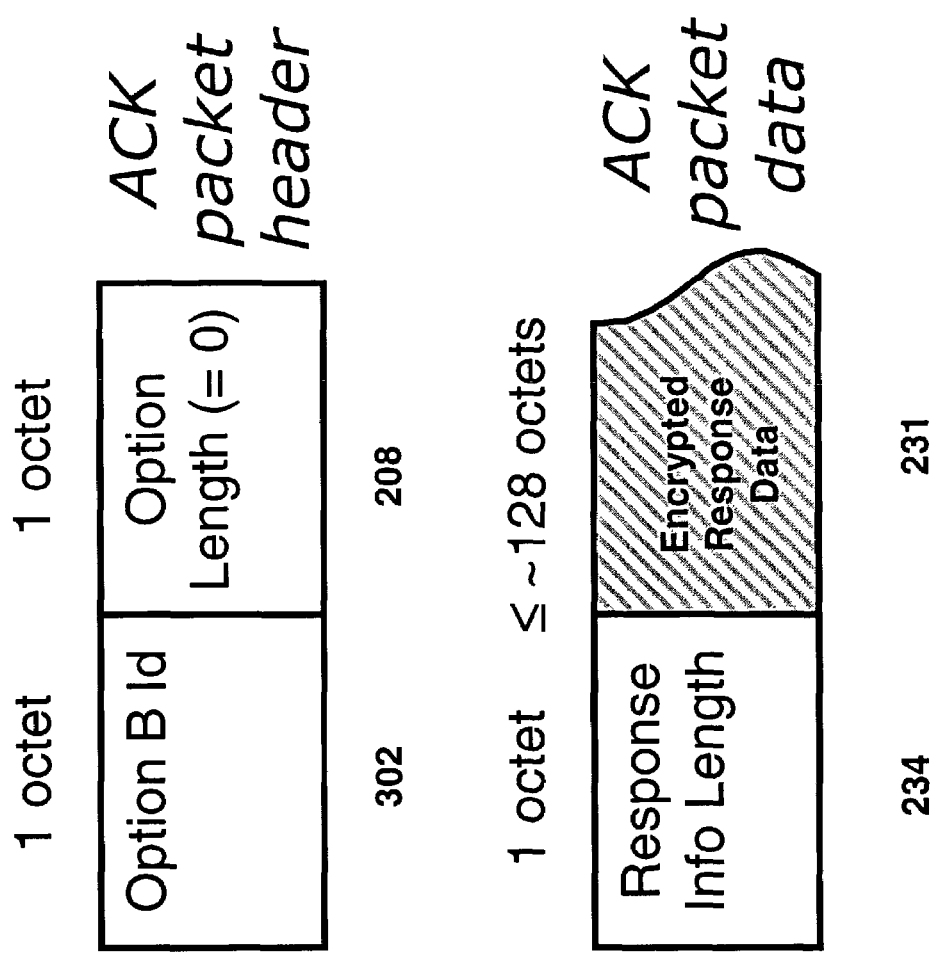
FIG. 17 shows an alternative layout of the TCP authentication option data in the optional response phase.

In another embodiment, as illustrated on FIG. 17, a single instance of a special TCP option 261, OPTION_B 303, is added to ACK packet 202 sent by client computer 100 to server computer 101. In one embodiment, OPTION_B 303 is comprised of an octet that contains option B Id 302, followed by a zero octet, option length 208, which indicates that length of the following TCP/IP option 261 data is 0. When OPTION_B 303 is used, encrypted response information is placed in the data portion of ACK packet 202.

Encrypted response information begins with a single octet, response info length 234, containing the length of the following encrypted response information. Octets following response info length 234 contain encrypted response data 231. In one embodiment, challenge data length is limited to approximately 128 octets due to the size limitation of the TCP/IP packet data size.

A Challenge Transformation Algorithm and Mutual Authentication in SYN/ACK and ACK When hosts use a secret key-based authentication method, server computer 101 generates an 8 octet long random value, Salt, concatenates it with a shared secret key value, Secret, and with the sequence number 150 field, Seq#, from TCP header 113 in SYN packet 200 sent by client computer 100. Server computer 101 applies a secure hash cryptographic algorithm (e.g., MD5, SHA-1, etc.) to the resulting octet sequence, thus generating a challenge value, Ch:

$$Ch=H(Salt|Secret|Seq\#)$$

Then server computer 101 concatenates the Salt value and the challenge value, Salt|Ch, and places the result in encrypted challenge data 224 field of SYN/ACK packet 201.

Upon receiving the challenge, client computer 100 verifies that the challenge value, Ch, was indeed sent by server computer 101 by locally recalculating that value. In order to create a response, client computer 100 concatenates the received challenge value, Ch, with the shared secret value, Secret, and computes a secure cryptographic hash of the result, e.g. MD5 or SHA-1:

$$H(Ch|Secret)$$

Client computer 100 places the computed response value in encrypted response data 231 field of the ACK packet 202. Upon receiving ACK packet 202, server computer 101 verifies the response value computed by the client computer 100.

Server computer 101 selects a secure cryptographic hash algorithm according to its local policy. Client computer 100 determines the type of secure cryptographic hash algorithm used by server computer 101 from the value found in the option length 204 field if OPTION_A 301 layout is used (e.g., 16 octets for MD5, 20 octets for SHA-1). If OPTION_B 303 layout is used, then client computer 100 determines the secure cryptographic hash algorithm used by server computer 101 from the value found in the challenge info length 227 field (e.g., 16 octets for MD5, 20 octets for SHA-1). To calculate the response value, client computer 100 must use the same secure cryptographic hash algorithm as is used by server computer 101 when it calculates the challenge value.

When hosts employ public key cryptography-based authentication methods, server computer 101 generates a 12 octet-long random value, Rand, concatenates it with sequence number 150 field, Seq#, from TCP header 113 in the SYN packet 200 sent by client computer 100, Ch=Rand|Seq#, and encrypts it with server computer 101 private key, $Prv^S$:

$$E_{Prv}S(Ch)$$

Server computer 101 places the result in encrypted challenge data 224 of SYN/ACK packet 201.

Upon receiving the challenge, client computer 100 decrypts the challenge value using server computer 101 public key, $Pub^S$:

$$Ch=D_{Pub}S(E_{Prv}S(Ch))$$

Client computer 100 verifies that the challenge, Ch, was indeed computed by server computer 101 by comparing the value of the Seq# with the sequence number value found in sequence number 150 field as sent by client computer 100 to server computer 101 in SYN packet 200.

After verifying the origin of the challenge value, client computer 100 encrypts the received challenge value, Ch, with client computer 100 private key, $Prv^C$:

$$E_{Prv}C(Ch)$$

Client computer 100 places the computed response value in encrypted response data 231 field of ACK packet 202.

Upon receiving ACK packet 202, server computer 101 decrypts the value in encrypted response data 231 field of ACK packet 202 using client computer 100 public key, $Pub^C$:

$$Ch=D_{Pub}C(E_{Prv}C(Ch))$$

Server computer 101 verifies client computer 100 response by comparing the decrypted Rand value with the random value which it sent to client computer 100 in SYN/ACK packet 201.

Figure 18:
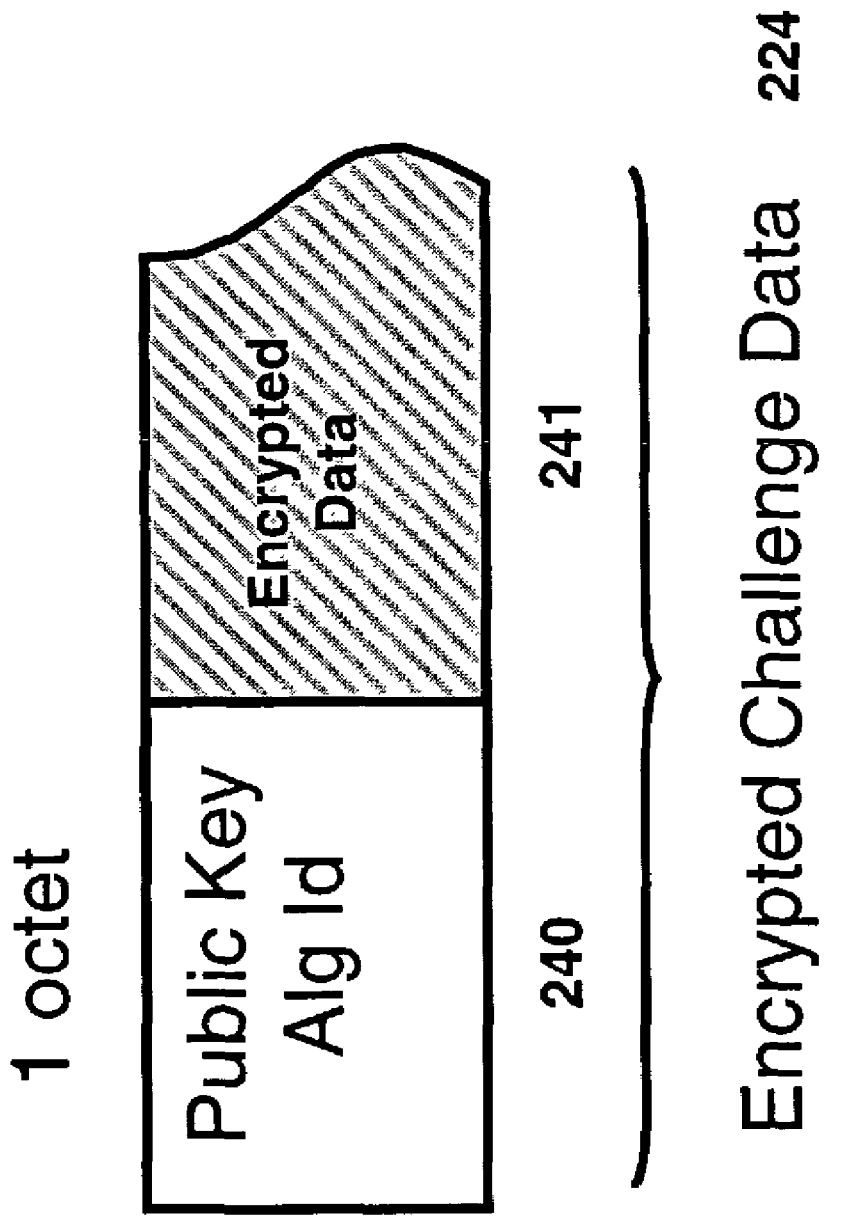
FIG. 18 shows an exemplary layout of the encrypted challenge data when hosts employ public key cryptographic methods.

FIG. 18 illustrates the structure of encrypted challenge data 224 field. The public key alg Id 240 octet contains a numeric identifier of a public key cryptographic algorithm used to encrypt challenge data in encrypted data 241 field that follows. The choice of public key cryptographic algorithm depends on server computer's 101 policy. In one embodiment, server computer 101 can choose, without limitation, to use original (e.g., RSA) or ECC (Elliptic Curve Cryptography) based versions of public key encryption algorithms. In one embodiment, hosts follow the PKCS#1 (Public Key Cryptography Standards #1) guidelines when performing original RSA public key encryption. The hosts follow the ANSI X9.62 (ECDSA) guidelines for the ECC variants of the public key encryption.

Data Layout for Various Authentication Methods

As described above, SYN packet 200 contains cryptographically secured data that authenticates client computer 100 to server computer 101. Following are descriptions of various embodiments that are meant to be illustrative, which do not exclude other embodiments of this invention.

Hashed Message Authentication Code

Hashed Message Authentication Code (HMAC) is an authentication method that may be used to authenticate client computer 100 to server computer 101. HMAC of SYN packet 200 is computed by concatenating the shared secret key, Secret, with values found in the following fields: source IP address 381, SrcIPAddr, destination IP address 381, DestIPAddr, source port number 153, SrcIPort#, Destination Port Number 154, DestPort#. In one embodiment, the HMAC computation is performed according to the guidelines found in the IETF RFC 2104 "HMAC: Keyed Hashing For Message Authentication" document ("RFC2104"):

$$HMAC(SrcIPAddr|DestIPAddr|SrcIPPort|DestIPPort|Secret)$$

Server computer 101 verifies the HMAC using data in SYN packet 200 sent by client computer 100.

Cryptographic Hash with a Timestamp

In another preferred embodiment, a different authentication method may be used to authenticate client computer 100 to server computer 101 is based on a timestamp provided by a trusted third party such as a NTP (Network Time Protocol) server. Client computer 100 concatenates a decimal ASCII value of the NTP timestamp, $T_C$, with the shared secret key, Secret, and, in one embodiment, computes a cryptographic hash value according to the guidelines found in the RFC2104:

$$H=HMAC(T_C|Secret)$$

Client computer 100 concatenates the timestamp, $T_C$, with the HMAC value, H, $T_C|H$, and sends it to server computer 101.

Upon receiving SYN packet 200 from client computer 100, server computer 101 verifies the HMAC value and, if successful, obtains a NTP timestamp, $T_S$, from a trusted server. Server computer 101 compares the trusted timestamp value, $T_S$, with the timestamp value received from client computer 100, $T_C$, and if the value of the timestamp value received from client computer 100, $T_C$, is within the window allowed by server computer 101 policy, $\Delta$, $|T_C-T_S|\leq\Delta$, server 101 computer accepts the communications session.

One-Time Password

In yet another preferred embodiment, the authentication method used to authenticate client computer 100 to server computer 101 is based on one-time password technology. Prior to establishing the first authenticated TCP/IP session, client computer 100 and server computer 101 agree on a pair of publicly known non-zero values, $Salt_0$, and $TrfCount_0$ (where $TrfCount_0<256$). Client computer 100 and server computer 101 also use another publicly known value, SeqCnt, which initially is set to zero.

In order to compute the next one-time password value, both client computer 100 and server computer 101 concatenate the $Salt_0$ value and the shared secret key, Secret, and computes its HMAC $TrfCount_0$ times:

$$OTP_0=HMAC^{TrfCount_0}(Salt_0|Secret)$$

To calculate the next one-time password value, $OTP_1$, both client computer 100 and server computer 101 subtract one from the $TrfCount_0$ value. If $TrfCount_0-1=0$, the host (client computer 100 or server computer 101) calculates $Salt_1$ value as:

$$Salt_1=HMAC(Salt_0|Secret)$$

The host also computes the next maximal transformation counter value, $TrfCount_1$, as:

$$TrfCount_1=HMAC(Salt_1|Secret)_{mod\ 256}$$

If $TrfCount_1=0$, the HMAC is calculated again:

$$TrfCount_1=HMAC(HMAC(Salt_1|Secret))_{mod\ 256}$$

This calculation continues until a non-zero value for $TrfCount_1$ is obtained. Once a new value of the maximal transformation counter is computed, the host (client computer 100 or server computer 101) increments the SeqCnt value by one.

In order to thwart replay attacks, the host (client computer 100 or server computer 101) which verifies a one-time-password value ensures that the-sequence counter value, $SeqCnt_C$, submitted by the claimant is greater or equal to the locally known sequence counter value, $SeqCnt_V$, and that the transformation counter value, $TrfCount_C$, submitted by the claimant is less or equal than the locally known transformation counter value, $TrfCount_V$:

$$SeqCnt_C \geq SeqCnt_V \text{ and } TrfCount_C \leq TrfCount_V$$

Figure 19:
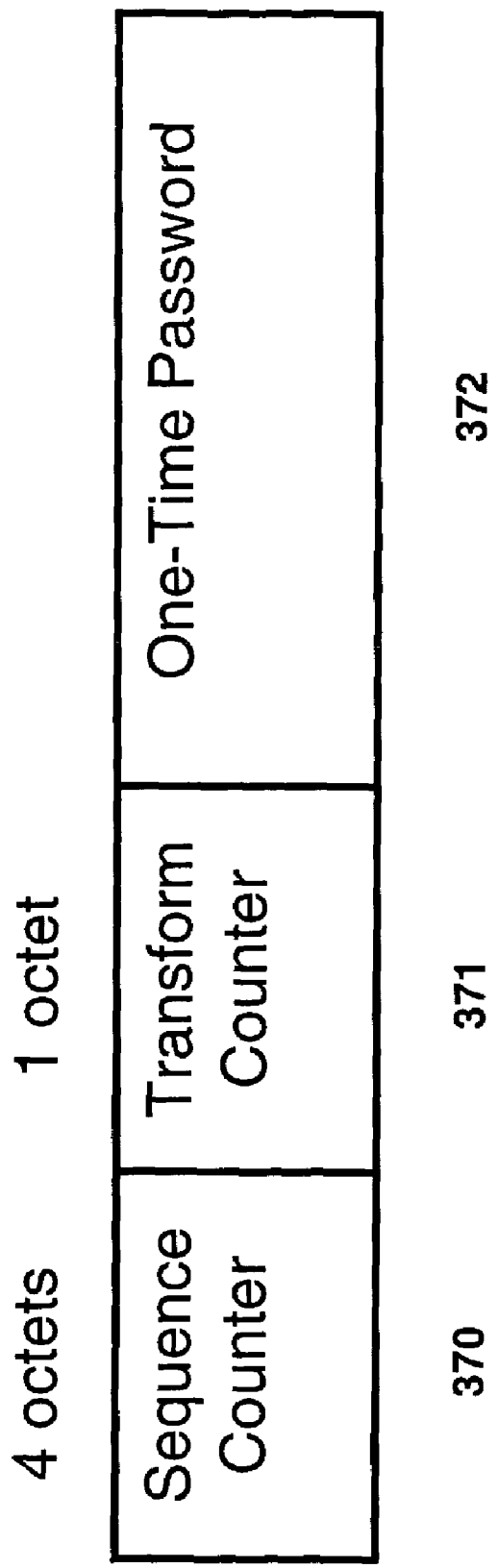
FIG. 19 shows an exemplary layout of the authentication data when the one-time password method is used for authentication.

FIG. 19 shows an exemplary layout of auth data 207 field when the one-time password authentication method is used. Client computer 100 places its computed one-time password value, $OTP_n$, in the one-time password 372 field, the $SeqCnt_i$ value into sequence counter field 370 and the $TrfCount_i$ value in transform counter field 371.

Public Key Cryptography

In still another embodiment, the authentication method used to authenticate client computer 100 to server computer 101 is based on public key cryptographic methods. In one embodiment, client computer 100 encrypts sequence number 150 field, Seq#, from the TCP header 113 in SYN packet 200 which it is preparing for transmission to server computer 101, with client computer 100 private key, $Prv^C$:

$$E_{Prv}c(Seq\#)$$

Upon receiving SYN packet 200 from client computer 100, server computer 101 decrypts the Seq# value using client computer 100 public key, $Pub^C$:

$$Seq\#=D_{Pub}c(E_{Prv}c(Seq\#))$$

Server computer 101 verifies that the sequence number, Seq#, contained in auth data 207 field is the same as the sequence number value found in sequence number 150 field of SYN packet 200 sent by client computer 100 to server computer 101.

Trusted Third Party

Figure 20:
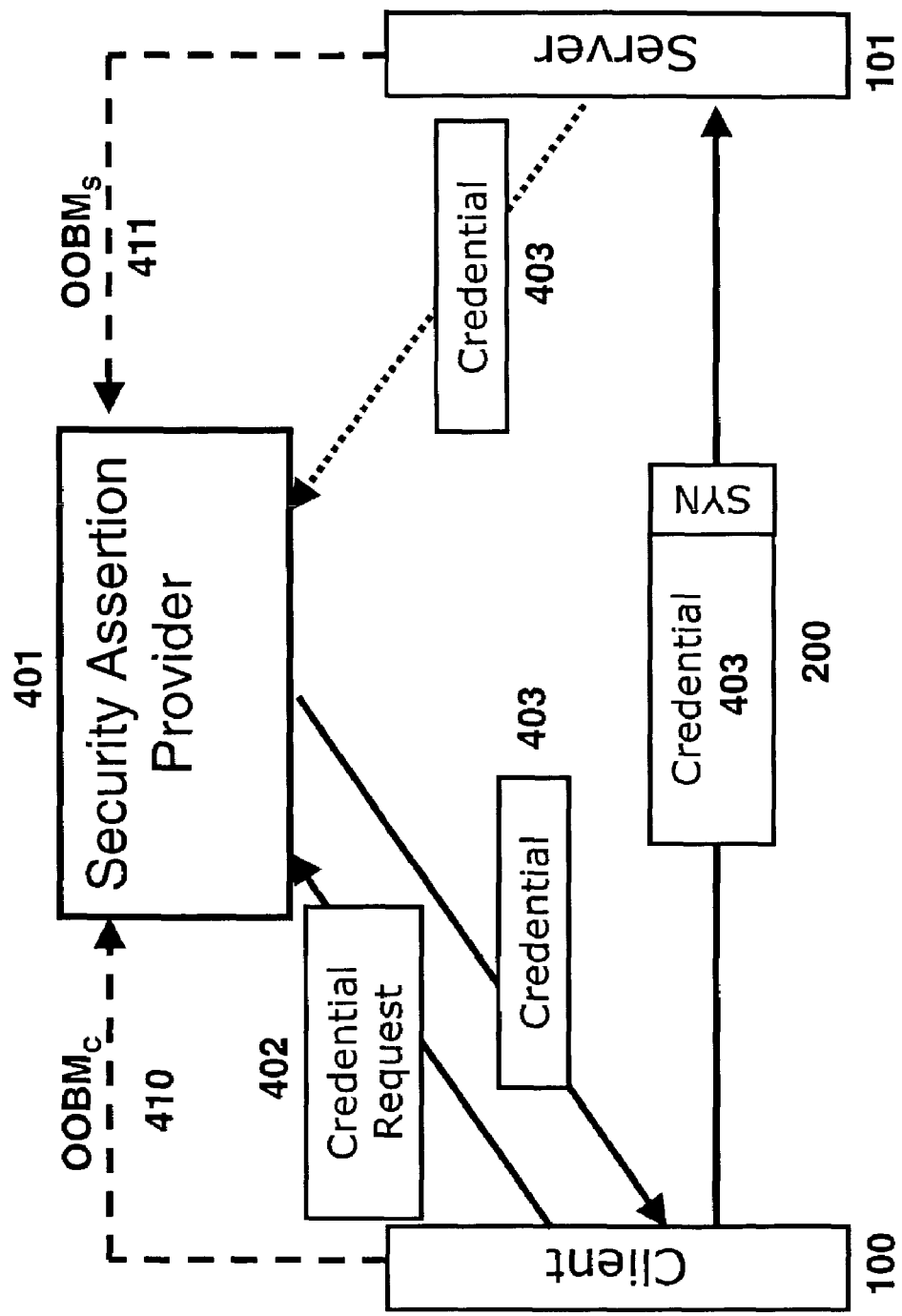
FIG. 20 illustrates authentication process involving a trusted third party authority.

FIG. 20 illustrates another embodiment in which the authentication method used to authenticate client computer 100 to server computer 101 based on the presence of a trusted security assertion provider. In one embodiment, server computer 101 and client computer 100 establish a trust relationship with a security assertion provider 401 entity. This trust relationship is established via some out-of-the-band methods $OOBM_C$410 and $OOBM_S$411.

When client computer 100 wishes to establish a new TCP/IP communications session with server computer 101, it sends to security assertion provider 401 a credential request 402 to ask for the issuance of an authentication credential. Security assertion provider 401 issues client computer 100 an authentication credential such as, without limitation, an authentication token, a digital certificate or a Kerberos ticket. Security assertion provider 401 forwards this issued credential 403 to client computer 100.

Upon receiving credential 403 from security assertion provider 401, client computer 100 embeds the credential 403 in SYN packet 200 and sends this packet to server computer 101.

When server computer 101 receives SYN packet 200, it extracts credential 403. Depending on the type of credential 403, server computer 101 verifies it, without limitation, locally, with security assertion provider 401 or any other trustworthy entity capable of verifying credential 403.

Non-encrypted Passwords

Password-based authentication may be used in one embodiment as the authentication method used to authenticate client computer 100 to server computer 101. Client computer 100 incorporates a password in SYN packet 200.

Upon receiving SYN packet 200 sent by client computer 100, server computer 101 compares the received password value with a locally stored value and accepts the connection if password values match.

Intermediaries

Figure 21:
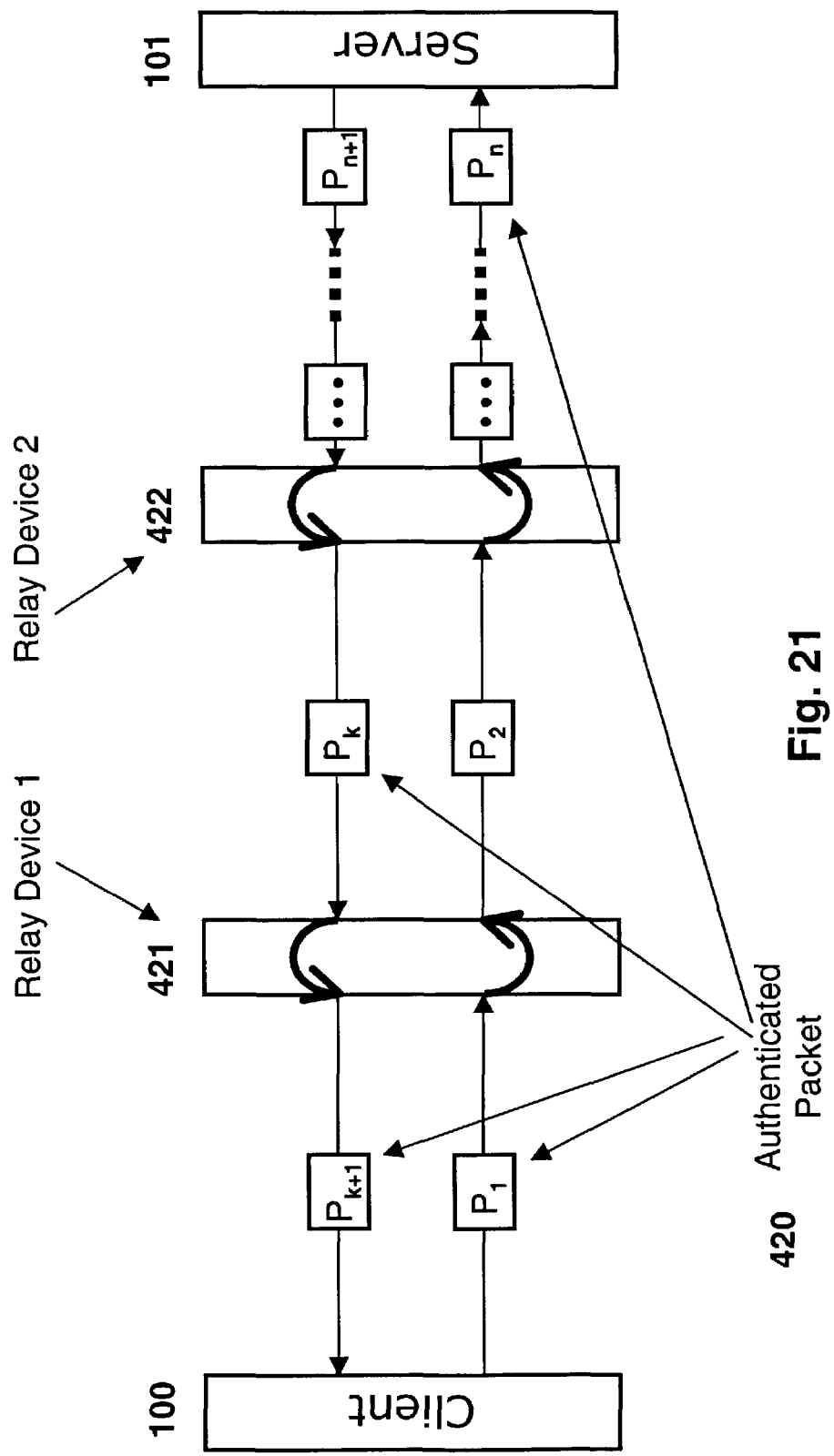
FIG. 21 illustrates one embodiment of an authentication process for a network in which there are one or more intermediary communication nodes.

FIG. 21 illustrates another embodiment in which the authentication method used to authenticate client computer 100 to server computer 101 is based on the presence of one or more intermediary communication nodes, relay devices 421–422, each of which relays authenticated packets 420 sent between client computer 100 and server computer 101.

In this embodiment, an authenticated packet 420, $P_1$, sent by client computer 100, is authenticated for acceptance by the next relay device 421. After authenticating the packet relay device 421 modifies or replaces authentication information in the packet with its own authentication information and forwards this modified authentication packet, $P_2$, to the next relay device 422, etc. Finally, authenticated packet 420, $P_n$, reaches server computer 101.

Upon receiving and verifying authentication information in authenticated packet 420, $P_n$, server computer 101 transmits the acceptance packet through the same on an alternative chain of relay devices 421–422.

Devices and Categories of Principals

Client computer 100 and/or server computer 101 may be any kind of computer, wireless devices, personal digital assistants (PDAs), laptop computers, phones or other communication devices or combinations thereof.

Furthermore, in one embodiment, client computer 100 is authenticated against a database of hosts stored in a computer readable memory. In such a case, peers being authenticated may have been registered before connection establishment was attempted. This memory may be part of server computer 101 or accessible thereby. In one embodiment, the authentication technique described herein is integrated with enterprise security systems, such as, for example, RADIUS, Windows Domain, etc., to determine valid peers.

In one embodiment, such a process in which authentication of registered peers may be performed includes accessing a memory storing a list of one or more valid peers, comparing the prospective peer with the list of one or more potentially valid peers and the data used to authenticate them to determine if the prospective peer is in the list, and authenticating the prospective peer if determined to be on the list. The data used to identify the peer is in the SYN packet. After a particular peer is determined to be valid, a server, such as server 101 described above, may use other information, such as, for example, the encrypted information or other forms of information described above in the SYN packet, to determine whether the prospective peer is who they say they are.

Conclusion

In conclusion, the techniques described herein provide for low cost and highly efficient safeguards for standard TCP/IP Servers deployed on private and public IP networks.

In one embodiment, teachings described herein prevent the establishment of connections to TCP/IP servers by unauthorized parties, whereas other methods of protection of such servers first allow a network connection, and then decide on authorization.

This allows for rendering selected TCP/IP servers invisible to all unauthorized network entities. This TCP/IP server's ability to avoid reconnaissance scans makes such servers invulnerable to the flooding Denial of Service (DoS) attacks.

The teachings described herein also enable the establishment of authenticated connections from applications otherwise incapable of providing authentication information (e.g., legacy applications) to network services deployed on a local or a remote network.

The invention could be deployed on wireless IP networks to prevent unauthorized access to network services from rogue wireless clients. Wireless networks are often left unprotected due to the high power consumption on the cryptographically enabled handheld clients and to the general complexity of securing a wireless network. It is common for rogue clients to attach to a known unprotected wireless network access point and to consume internal network resources without permission. The present invention provides a lightweight method of authenticating low powered wireless clients to the internal TCP/IP Servers.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

authenticating a prospective peer on the network prior to establishing a network connection and prior to an authenticating peer and the prospective peer accepting any application level authentication data from each other that are part of a post-connection establishment exchanged between peers, including sending authentication data in a TCP/IP layer in one or more packets selected from a group consisting of a SYN packet, SYN-ACK packet and an ACK packet; and wherein authenticating the prospective peer occurs during and before completion of a connection establishment phase of a TCP/IP protocol used for communication on the network, with an initial packet sent between the peers or with multiple exchanges between the peers that are part of connection establishment phase.

2. The method in claim 1, wherein authenticating the prospective peer occurs in the first packet sent by one peer to another peer.

3. The method in claim 1, wherein authenticating the prospective peer occurs in multiple exchanges that are part of connection establishment.

4. The method in claim 1, wherein authenticating the prospective peer comprises sending authentication data that resides in a TCP header.

5. The method in claim 1, wherein authenticating the prospective peer comprises sending authentication data that resides in a TCP header and/or data.

6. The method in claim 1, wherein authenticating the prospective peer occurs during an initial connection establishment phase of the TCP/IP protocol.

7. The method in claim 6, wherein authenticating the prospective peer includes sending authentication information within a carrier protocol that is encapsulated in one or more other protocols.

8. The method in claim 7, wherein the one or more other protocols includes at least one selected from a group that includes IPSec and PPTP.

9. The method in claim 6, further comprising sending authentication data in any combination of two or more SYN, SYN-ACK or ACK packets.

10. The method in claim 9, wherein authenticating the prospective peer is performed using secret key cryptography.

11. The method in claim 9, wherein authenticating the prospective peer is performed using public key cryptography.

12. The method in claim 1, wherein authenticating the prospective peer is performed using secret key cryptography.

13. The method in claim 1, wherein authenticating the prospective peer is performed using a Hashed Message Authentication Code (HMAC).

14. The method in claim 1, wherein authenticating the prospective peer is performed using a HMAC with a timestamp.

15. The method in claim 1, wherein authenticating the prospective peer is performed using a "one time password".

16. The method in claim 1, wherein authenticating the prospective peer is performed using public key cryptography.

17. The method in claim 1, wherein authenticating the prospective peer is performed using a trusted third party.

18. The method in claim 1, wherein authenticating the prospective peer is performed using a plain text password.

19. The method in claim 1, wherein authenticating the prospective peer is performed via a set of intermediaries on each hop.

20. The method in claim 1, wherein authenticating the prospective peer occurs via data sent and received in individual packets.

21. The method in claim 20 wherein each individual packet is relayed by one or more hardware or software devices.

22. The method is claim 21, further comprising each of the one or more hardware or software devices authenticating at least one of the individual packets being relayed.

23. The method in claim 21, further comprising the one or more hardware or software devices changing authentication information in at least one of the individual packets.

24. The method in claim 1, wherein authenticating the prospective peer occurs via the data sent and received in a plurality of packets.

25. The method in claim 24 wherein the plurality of packets are relayed by one or more hardware or software devices.

26. The method is claim 25, further comprising each of the one or more hardware or software devices authenticating packets in the plurality of packets being relayed.

27. The method in claim 25, further comprising the one or more hardware or software devices changing authentication information in at least one of the plurality of packets.

28. The method in claim 1, wherein authenticating the prospective peer on the network comprises communicating over a local network with the prospective peer.

29. The method in claim 1, wherein authenticating the prospective peer on the network comprises communicating over a plurality of interconnected networks.

30. The method in claim 1, wherein authenticating the prospective peer on the network comprises communicating over virtual networks.

31. The method in claim 1, wherein authenticating the prospective peer on the network comprises communicating over wide area networks.

32. The method in claim 1, wherein communication occurs between computers, wireless devices, PDAs, laptop computers, phones or other communication devices or combinations thereof.

33. The method in claim 1, wherein authenticating the prospective peer on the network comprises:
accessing a memory storing a list of one or more valid peers;
comparing the prospective peer with the list of one or more potentially valid peers; and
if determined to be on the list of potentially valid peers, authenticating the prospective peer based on an authentication method being employed.

34. An apparatus comprising:
means for receiving one or more packets; and
means for authenticating a prospective peer on the network during a connecton establishment phase prior to establishing a network connection and prior to an authenticating peer and the prospective peer accepting any application level authentication data from each other that are part of a post-connection establishment exchange between peers, the means for authenticating including means for sending authentication data in a TCP/IP layer in one or more packets selected from a group consisting of a SYN packet, SYN-ACK packet and an ACK packet, and
wherein authenticating the prospective peer occurs during and before completion of a connection establishment phase of TCP/IP protocol used for communication on the network, with an initial packet sent between the peers or with multiple exchanges between the peers, that are part of connection establishment phase.

35. An article of manufacture having one or more recordable media with executable instructions stored thereon which, when executed by a system, cause the system to authenticate a prospective peer on the network during a connection establishment phase prior to establishing a network connection and prior to an authenticating peer and the prospective peer accepting any application level authentication data from each other that are part of a post-connection establishment exchange between peers, including sending authentication data in a TCP/IP layer in one or more packets selected from a group consisting of a SYN packet, SYN-ACK packet and an ACK packet, and
wherein authenticating the prospective peer occurs during and before completion of a connection establishment phase of a TCP/IP protocol used for communication on the network, with an initial packet sent between the peers or with multiple exchanges between the peers that are part of connection establishment phase.

36. A method comprising:
   a first peer receiving a SYN packet from a second peer over a network during a connection establishment phase prior to a network connection being established between the first and second peers and prior to the first and second peers accepting any data packets from each other that are part of a post-connection establishment exchange between peers; and
   using information in the SYN packet during and before completion of a connection establishment phase of a TCP/IP protocol used for communication on the network to attempt to authenticate the second peer prior to the network connection being established.

37. The method defined in claim 36 wherein the information is in an option field in the SYN packet.

38. The method defined in claim 36 wherein the information is in an option field and/or in a data portion of the SYN packet.

39. The method defined in claim 36 further comprising the first peer preventing the network connection from being established in response to determining the second peer is not authorized to access the first peer.

40. The method defined in claim 36 further comprising the first peer preventing access to one or more network services in response to determining the second peer is not authorized for such access.

41. The method defined in claim 36 wherein using information in the SYN packet comprises verifying at least a portion of the information.

42. The method defined in claim 36 wherein the first peer uses an authentication method to authenticate the second peer.

43. The method defined in claim 42 wherein the authentication method comprises a cryptographic hashed message authentication code (HMAC).

44. The method defined in claim 42 wherein the authentication method comprises a cryptographic hash with timestamp.

45. The method defined in claim 42 wherein the authentication method comprises a one time password.

46. The method defined in claim 42 wherein the authentication method comprises a public key cryptography-based authentication method.

47. The method defined in claim 42 wherein the authentication method is based on a security assertion provided by a trusted third party.

48. The method in claim 36, wherein the information in the SYN packet to authenticate the second peer comprises a plain text password.

49. The method in claim 36, wherein using information in the SYN packet comprises:
   accessing a memory storing a list of one or more valid peers;
   comparing the prospective peer with the list of one or more potentially valid peers; and
   if determined to be on the list of potentially valid peers, authenticating the prospective peer based on an authentication method being employed.

50. An article of manufacture having one or more recordable media with executable instructions stored thereon which, when executed by a system, cause the system to:
   receive a SYN packet from a second peer over a network during a connection establishment phase prior to a network connection being established between a first peer and a second peer and a second peer and prior to the first and second peers accepting any application level authentication data from each other that are part of a post-connection establishment exchange between peers; and
   use information in the SYN packet during and before completion of a connection establishment phase of a TCP/IP protocol used for communication on the network to attempt to authenticate the second peer prior to the network connection being established.

51. The article of manufacture defined in claim 50 wherein the information is in an option field in the SYN packet.

52. The article of manufacture defined in claim 50 wherein the information is in an option field and/or in a data portion of the SYN packet.

53. The article of manufacture defined in claim 50 further comprising instructions which when executed by the system cause the system to prevent the network connection from being established in response to determining the second peer is not authorized to access the first peer.

54. The article of manufacture defined in claim 50 further comprising instructions which when executed by the system cause the system to prevent access to one or more network services in response to determining the second peer is not authorized for such access.

55. The article of manufacture defined in claim 50 wherein instructions to cause the system to use information in the SYN packet comprises instructions which when executed by the system cause the system to verify at least a portion of the information.

56. The article of manufacture defined in claim 50 wherein the instructions when executed cause the system to employ an authentication method to authenticate the second peer.

57. The article of manufacture defined in claim 56 wherein the authentication method comprises a cryptographic hashed message authentication code (HMAC).

58. The article of manufacture defined in claim 56 wherein the authentication method comprises a cryptographic hash with timestamp.

59. The article of manufacture defined in claim 56 wherein the authentication method comprises a one time password.

60. The article of manufacture defined in claim 56 wherein the authentication method comprises a public key cryptography-based authentication method or a secret key cryptography-based authentication method.

61. The article of manufacture defined in claim 56 wherein the authentication method is based on a security assertion provided by a trusted third party.

62. The article of manufacture in claim 50, wherein the information in the SYN packet to authenticate the second peer comprises a plain text password.

63. The article of manufacture in claim 50, wherein instructions that cause the system to use information in the SYN packet comprises instructions which when executed by the system cause the system to:
   access a memory storing a list of one or more valid peers;
   comparing the prospective peer with the list of one or more potentially valid peers; and
   if determined to be on the list of potentially valid peers, authenticate the prospective peer based on an authentication method being employed.

64. An apparatus comprising:
- means in a first peer for receiving a SYN packet from a second peer over a network during a connection establishment phase prior to a network connection being established between the first and second peers and prior to the first and second peers accepting any application level authentication data form each other that are part of a post-connection establishment exchange between peers; and
- means for using information in the SYN packet during and before completion of a connection establishment phase of a TCP/IP protocol used for communication on the network to attempt to authenticate the second peer prior to the network connection being established.

65. The apparatus defined in claim 64 wherein the information is in an option field in the SYN packet.

66. The apparatus defined in claim 64 wherein the information is in an option field and/or in a data portion of the SYN packet.

67. The apparatus defined in claim 64 further comprising means in the first peer for preventing the network connection from being established in response to determining the second peer is not authorized to access the first peer.

68. The apparatus defined in claim 64 further comprising means in the first peer for preventing access to one or more network services in response to determining the second peer is not authorized for such access.

69. A method comprising:
- a first peer creating a SYN packet that includes information to be used by a second peer to attempt to authenticate the first peer during a connection establishment phase prior to the network connection being established between the first and second peers and prior to the first and second peers accepting any application level authentication data form each other that are part of a post-connection establishment exchange between peers; and
- the first peer sending the SYN packet during and before completion of a connection establishment phase of a TCP/IP protocol used for communication on the network to the second peer over a network for authentication prior to a network connection being established between the first and second peers.

70. The method in claim 69 wherein the information is in an option field in the SYN packet.

71. The method in claim 69 wherein the information is in an option field and/or in a data portion of the SYN packet.

72. The method in claim 69 wherein the information is encrypted.

73. The method in claim 72 wherein the information is encrypted so that a cryptographic hashed message authentication code (HMAC) authentication method may be used between the first and second peers to authenticate the first peer.

74. The method in claim 72 wherein the information is encrypted so that a cryptographic hash with timestamp authentication method may be used between the first and second peers to authenticate the first peer.

75. The method defined in claim 72 wherein the information is encrypted so that a one time password authentication method may be used between the first and second peers to authenticate the first peer.

76. The method defined in claim 72 wherein the information is encrypted so that a public key cryptography-based authentication method may be used between the first and second peers to authenticate the first peer.

77. The method defined in claim 72 wherein the information is encrypted so that an authentication method based on a security assertion provided by a trusted third party may be used between the first and second peers to authenticate the first peer.

78. The method defined in claim 72 wherein the information is encrypted so that an authentication method based on a plain text password may be used between the first and second peers to authenticate the first peer.

79. An article of manufacture having one or more recordable media with executable instructions stored thereon which, when executed by a system, cause the system to:
- create a SYN packet that includes information to be used by a second peer to attempt to authenticate the first peer during a connection establishment phase prior to the network connection being established between a first peer and a second peer and prior to the first and second peers accepting any application level authentication data from each other that are part of a post-connection establishment exchange between peers; and
- send the SYN packet during and before completion of a connection establishment phase of a TCP/IP protocol used for communication on the network to the second peer over a network for authentication prior to a network connection being established between the first and second peers.

80. The article of manufacture in claim 79 wherein the information is in an option field in the SYN packet.

81. The article of manufacture in claim 79 wherein the information is in an option field and/or in a data portion of the SYN packet.

82. The article of manufacture in claim 79 wherein the information is encrypted.

83. An apparatus comprising:
- means in a first peer for creating a SYN packet that includes information to be used by a second peer to attempt to authenticate the first peer during a connection establishment phase prior to the network connection being established between the first and second peers and prior to the first and second peers accepting any application level authentication data from each other that are part of a post-connection establishment exchange between peers; and
- means for sending the SYN packet during and before completion of a connection establishment phase of a TCP/IP protocol used for communication on the network to the second peer over a network for authentication prior to a network connection being established between the first and second peers.

84. The apparatus in claim 83 wherein the information is in an option field in the SYN packet.

85. The apparatus in claim 83 wherein the information is in an option field and/or in a data portion of the SYN packet.

86. The apparatus in claim 83 wherein the information is encrypted.

* * * * *